United States Patent
Suehiro

(10) Patent No.: US 8,482,649 B2
(45) Date of Patent: Jul. 9, 2013

(54) IMAGE DISPLAY DEVICE, PORTABLE DEVICE WITH PHOTOGRAPHY FUNCTION, IMAGE DISPLAY METHOD AND COMPUTER READABLE MEDIUM

(75) Inventor: Masako Suehiro, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/227,013

(22) Filed: Sep. 7, 2011

(65) Prior Publication Data

US 2012/0032980 A1 Feb. 9, 2012

Related U.S. Application Data

(63) Continuation of application No. 12/219,430, filed on Jul. 22, 2008, now Pat. No. 8,040,421.

(30) Foreign Application Priority Data

Sep. 27, 2007 (JP) ................................ 2007-252395

(51) Int. Cl.
H04N 5/222 (2006.01)
(52) U.S. Cl.
USPC .................................. 348/333.02; 348/208.1
(58) Field of Classification Search
USPC .................. 348/207.99, 208.1, 208.2, 231.3, 348/333.02
See application file for complete search history.

(56) References Cited

U.S. PATENT DOCUMENTS

| | | | |
|---|---|---|---|
| 5,602,564 A | 2/1997 | Iwamura et al. | |
| 5,945,976 A | 8/1999 | Iwamura et al. | |
| 6,282,362 B1 | 8/2001 | Murphy et al. | |
| 6,437,797 B1 | 8/2002 | Ota | |
| 6,552,744 B2 | 4/2003 | Chen | |
| 7,312,766 B1 | 12/2007 | Edwards | |
| 2003/0122945 A1 | 7/2003 | Muramatsu | |
| 2003/0231243 A1* | 12/2003 | Shibutani | 348/207.99 |
| 2007/0223900 A1* | 9/2007 | Kobayashi et al. | 396/50 |

FOREIGN PATENT DOCUMENTS

| | | |
|---|---|---|
| JP | 5-134600 A | 5/1993 |
| JP | 5-158887 A | 6/1993 |
| JP | 10-233985 A | 9/1998 |
| JP | 2001-051766 A | 2/2001 |
| JP | 2003-510864 A | 3/2003 |
| JP | 2004-080359 A | 3/2004 |
| JP | 2004-266636 A | 9/2004 |
| JP | 2005-086238 A | 3/2005 |
| JP | 2007-129407 A | 5/2007 |

OTHER PUBLICATIONS

Japanese Office Action dated Jun. 28, 2011 with an English translation thereof.
Notice of Reasons for Rejection dated Jan. 22, 2013, with Partial English Translation.

* cited by examiner

Primary Examiner — Gevell Selby
(74) Attorney, Agent, or Firm — McGinn IP Law Group, PLLC

(57) ABSTRACT

An image display device including a display that displays an image according to a piece of photography image data on a display screen based on plural pieces of photography image data stored in a storage unit, so as to display another image that includes photography attitude angle information that represents an attitude angle with an angle altered according to the attitude angle alteration amount with respect to an attitude angle which is represented by the photography attitude angle information of the image which is displayed.

11 Claims, 21 Drawing Sheets

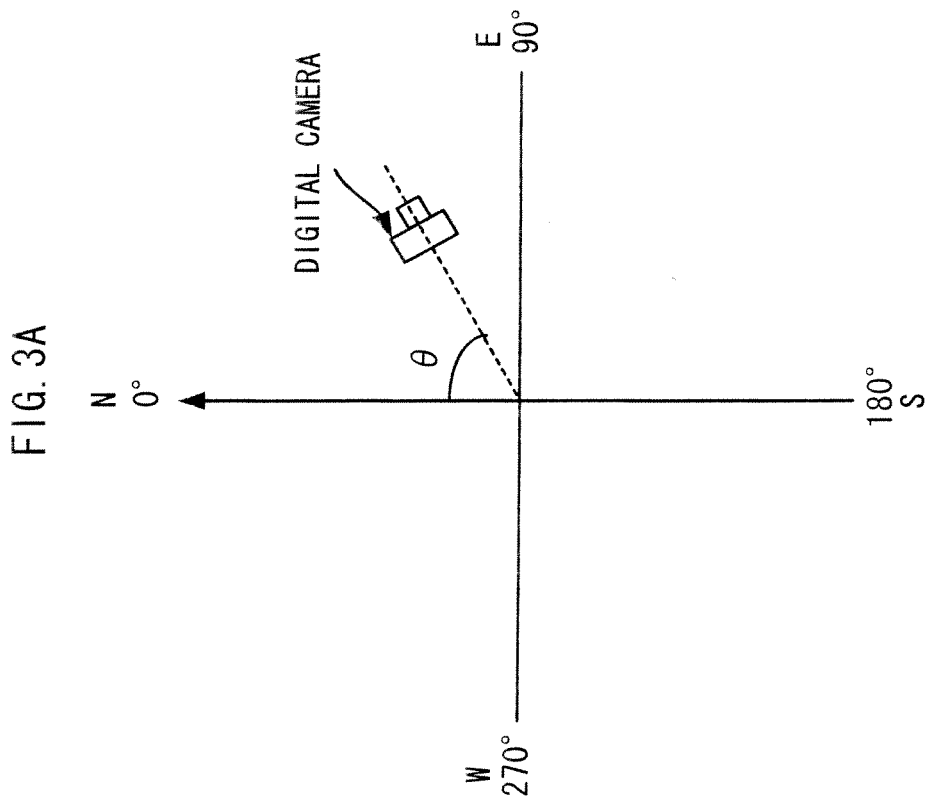
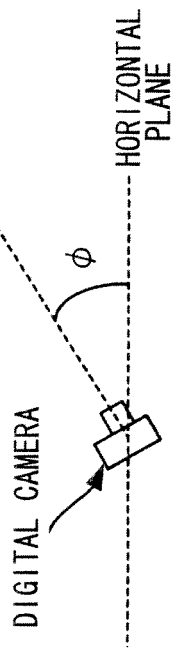
FIG. 3A
FIG. 3B

FIG. 5

| ID No. | FILENAME | PHOTOGRAPHY DATE/TIME | PHOTOGRAPHY POSITION | ATTITUDE ANGLE | |
|---|---|---|---|---|---|
| | | | | PHOTOGRAPHY ANGLE A | PHOTOGRAPHY BEARING D |
| 1 | DSCF0001.JPG | 2007/07/23 14:51 | N35.658412/E139.747016 | 0° | 270° |
| 2 | DSCF0002.JPG | 2007/07/23 15:13 | N35.658412/E139.747016 | -90° | 320° |
| 3 | DSCF0003.JPG | 2007/07/23 15:16 | N35.658412/E139.747016 | 70° | 90° |
| 4 | DSCF0004.JPG | 2007/07/23 18:32 | N35.658412/E139.747016 | 0° | 180° |
| 5 | DSCF0005.JPG | 2007/08/02 08:42 | N35.658632/E135.495586 | 0° | 90° |
| 6 | DSCF0006.JPG | 2007/08/02 08:45 | N35.658632/E135.495586 | 90° | 180° |
| 7 | DSCF0007.JPG | 2007/08/03 13:27 | N34.985847/E135.758743 | 0° | 0° |
| ... | ... | ... | ... | ... | ... |

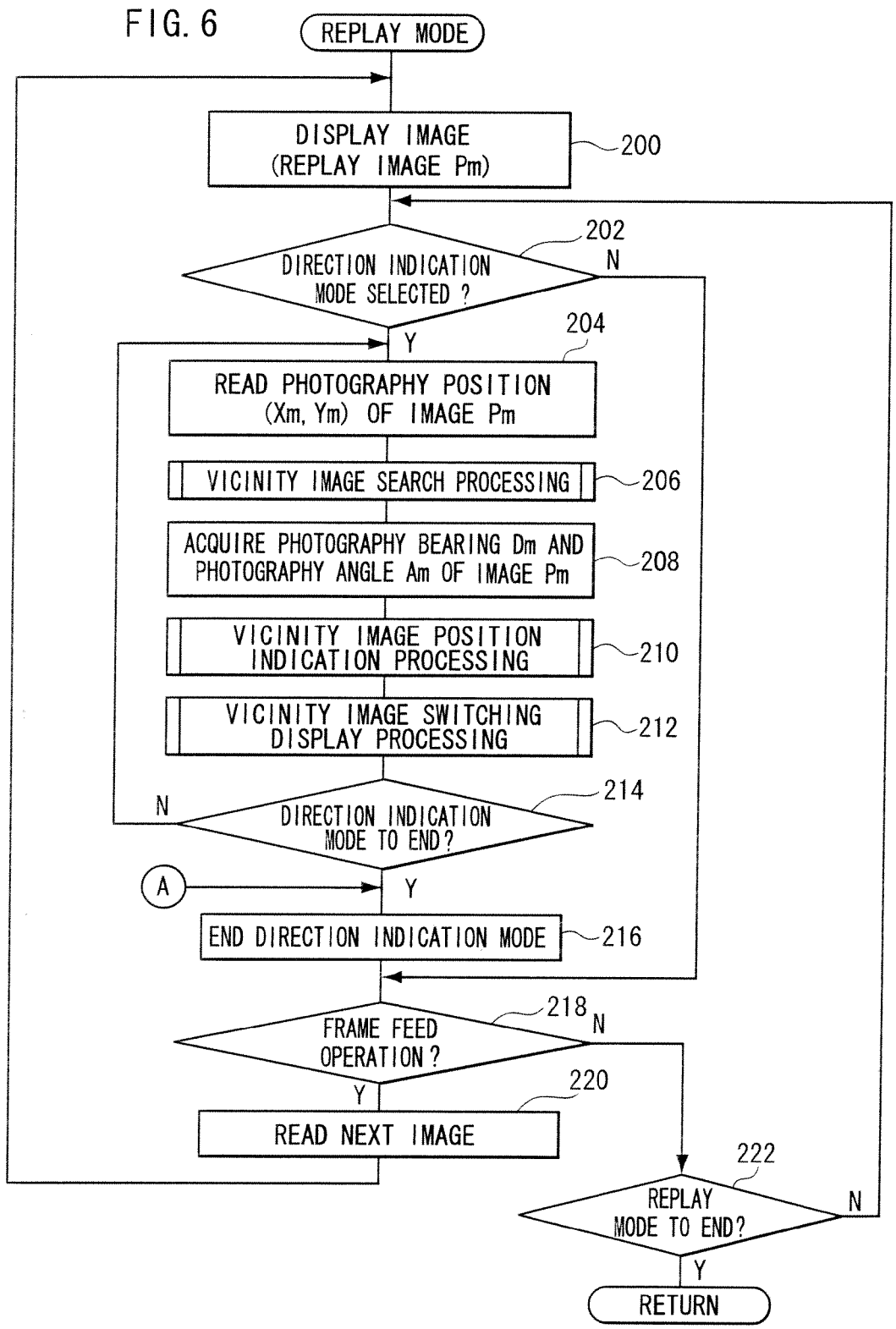

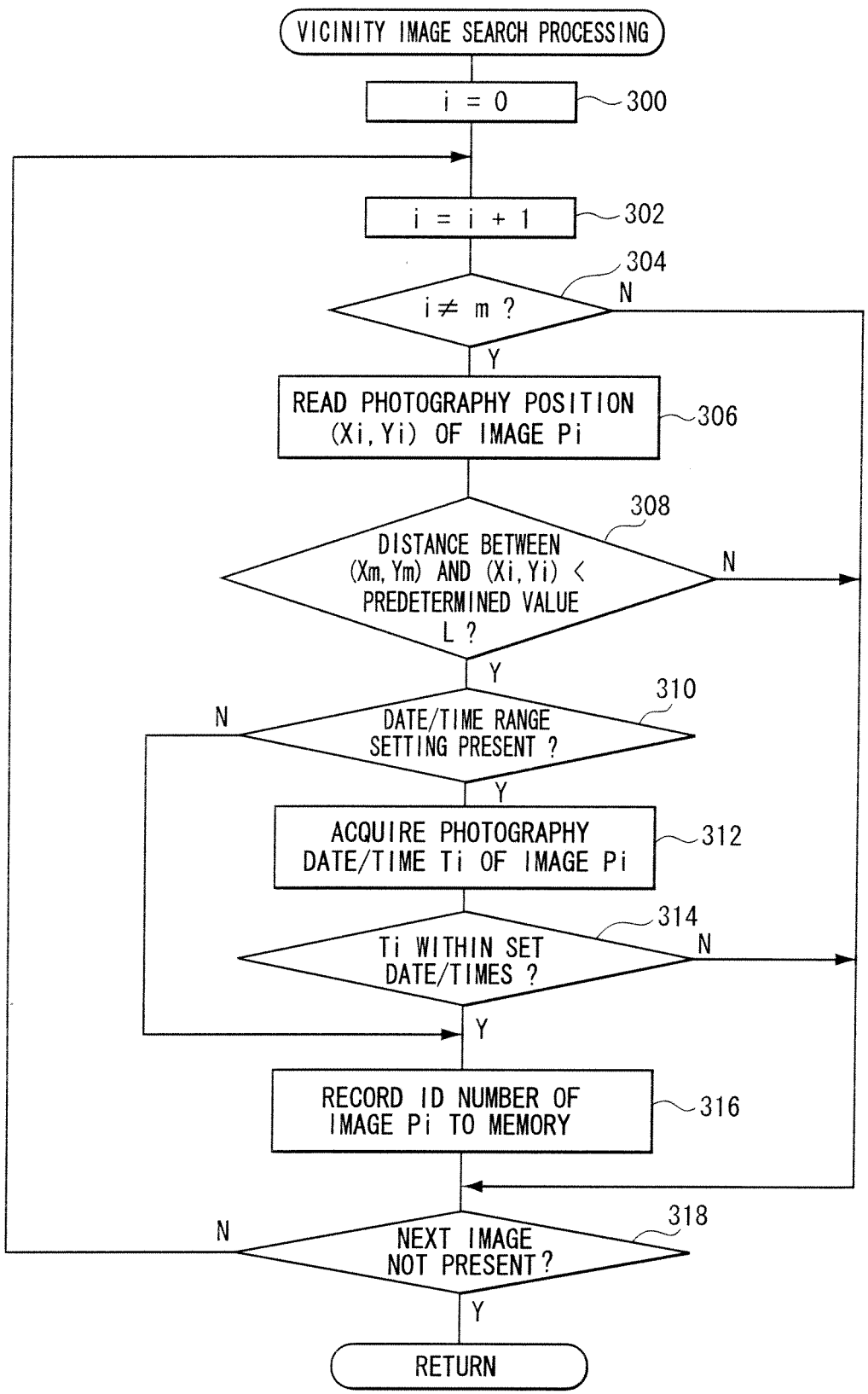

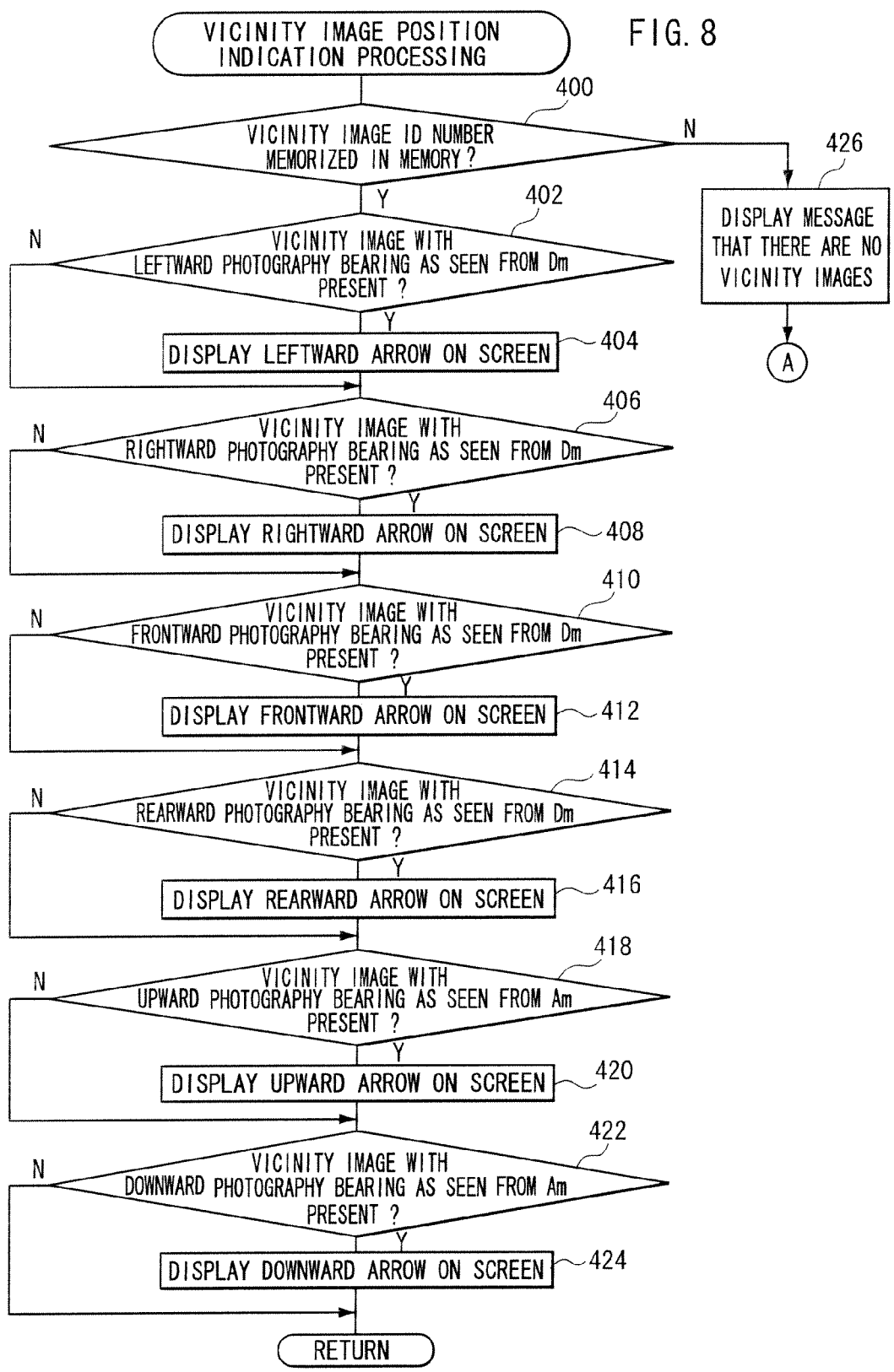

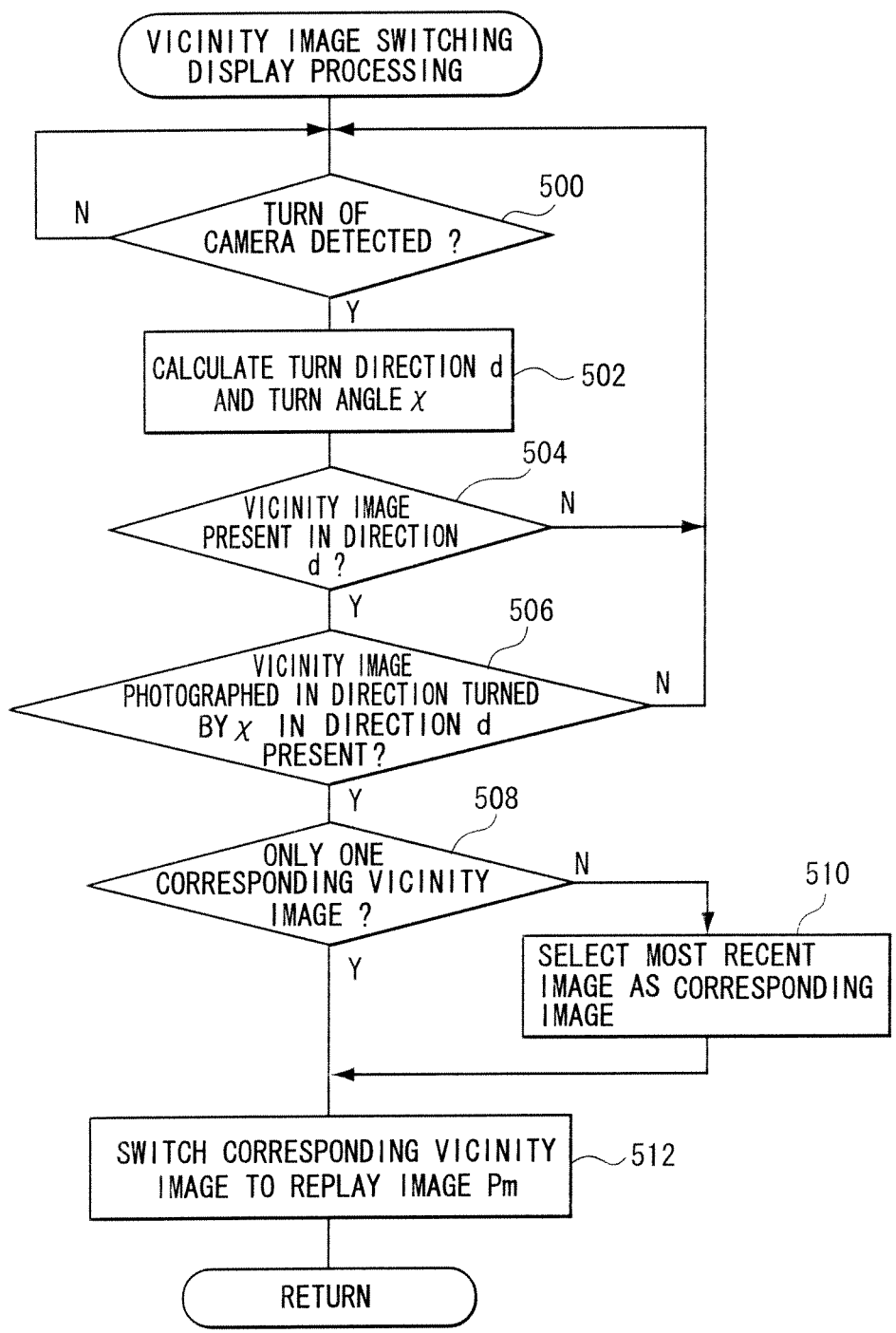

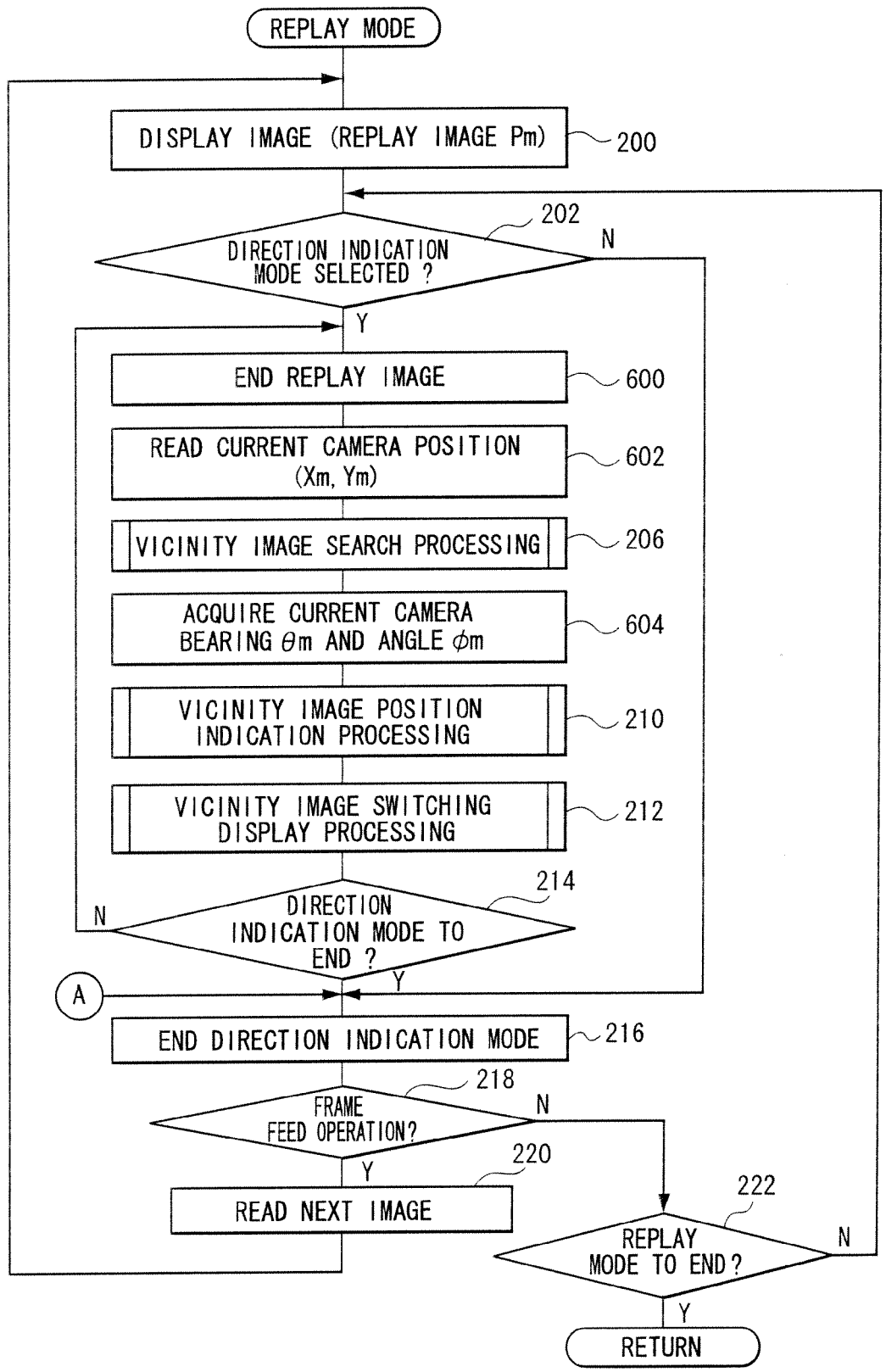

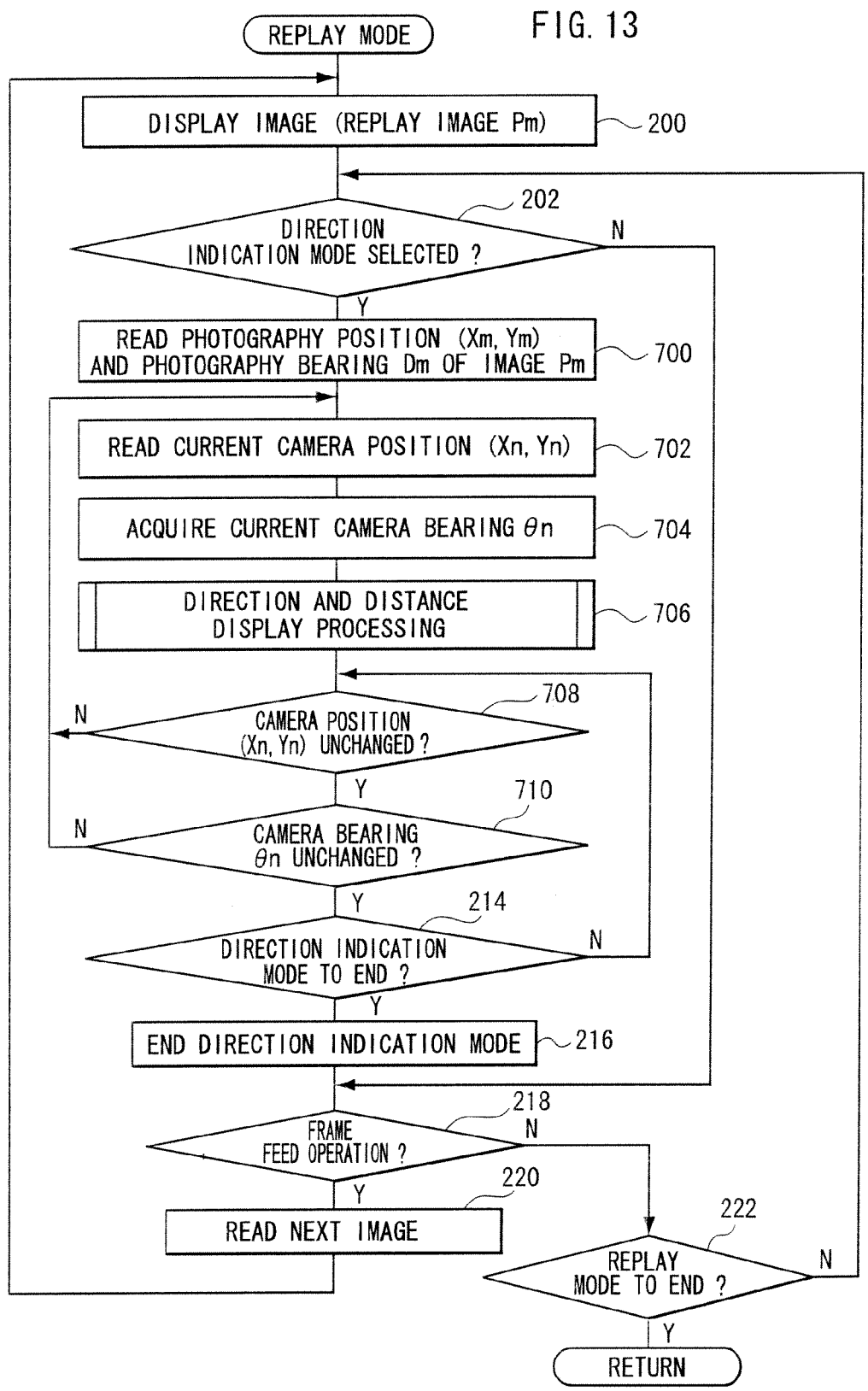

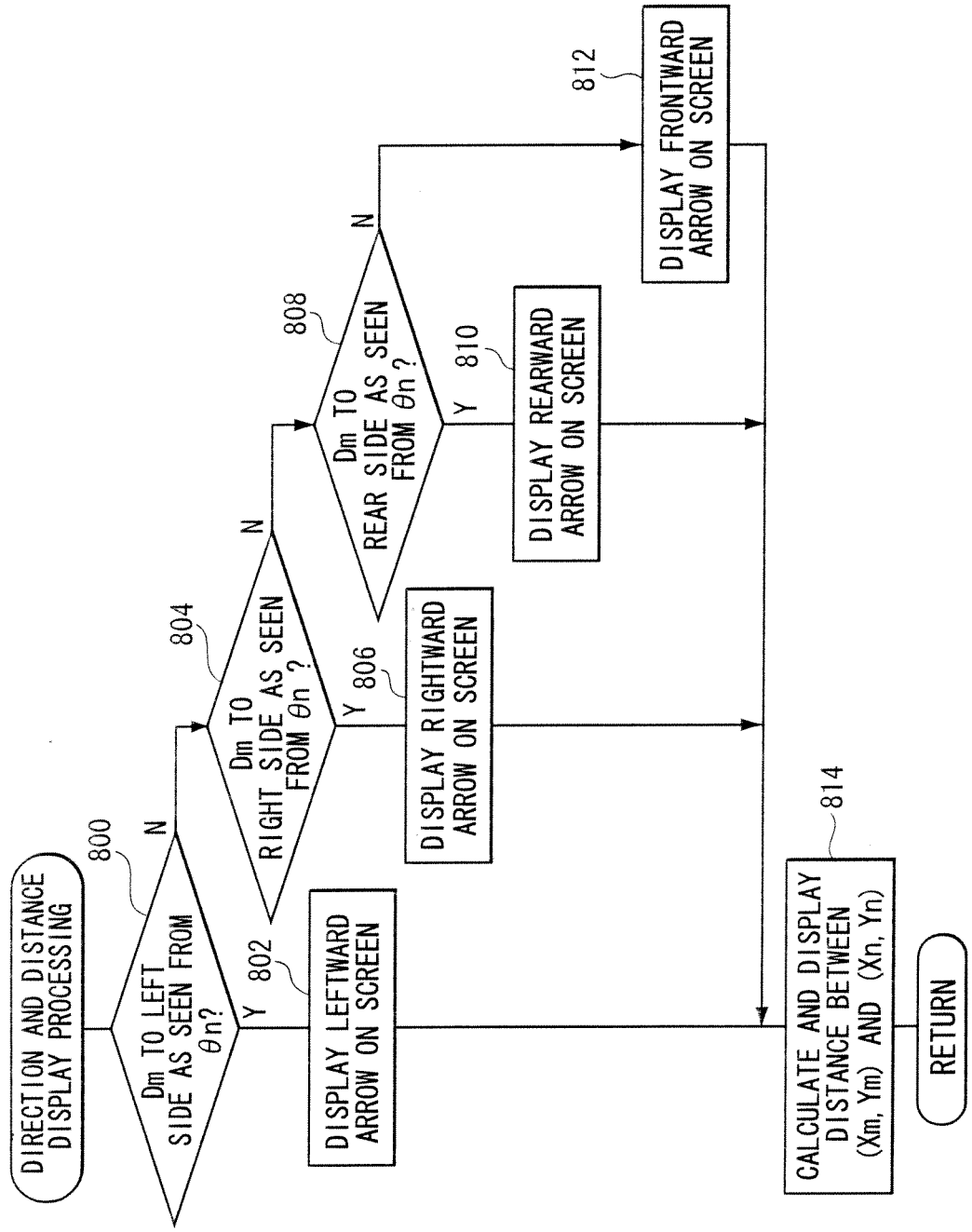

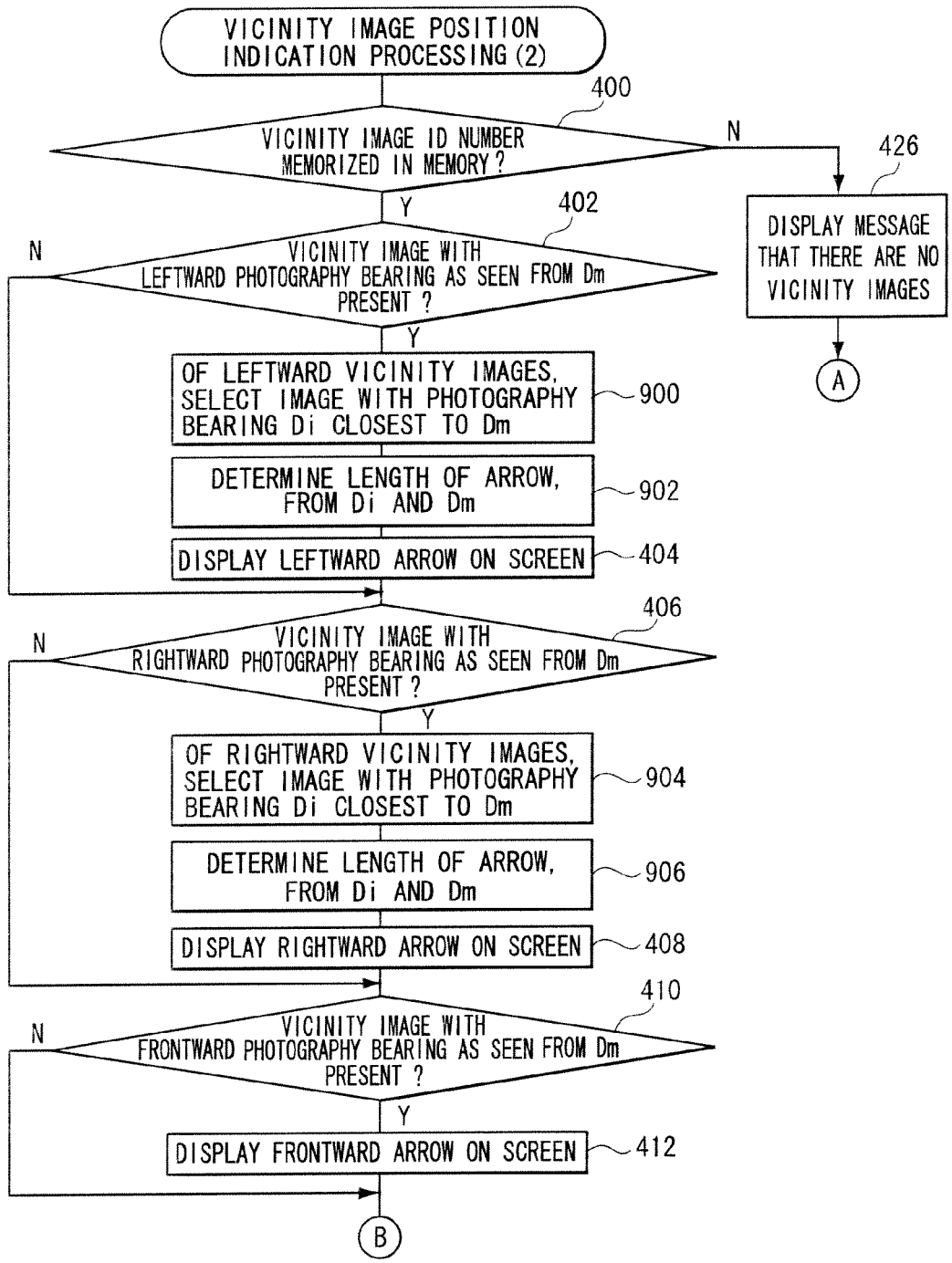

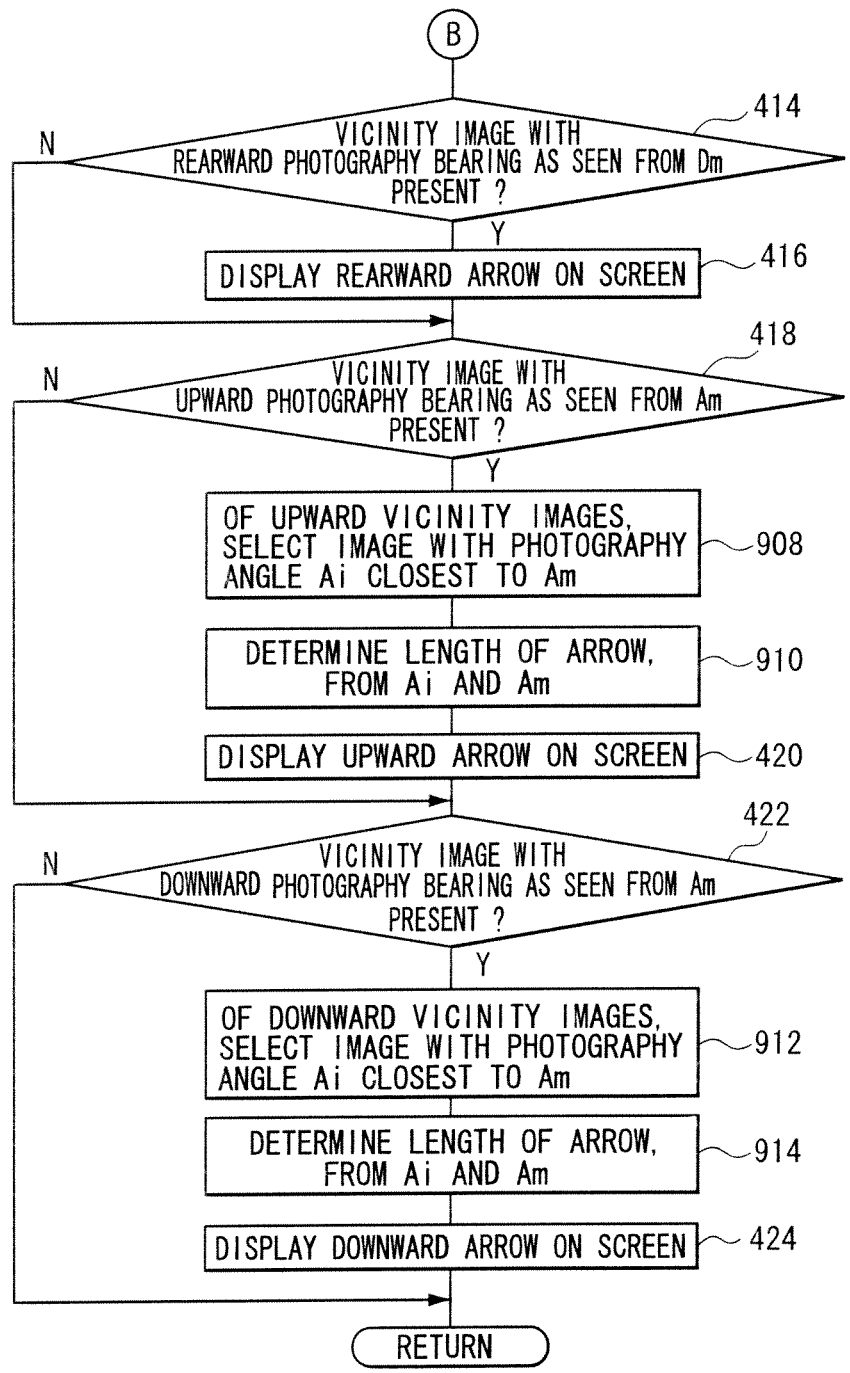

US 8,482,649 B2

IMAGE DISPLAY DEVICE, PORTABLE DEVICE WITH PHOTOGRAPHY FUNCTION, IMAGE DISPLAY METHOD AND COMPUTER READABLE MEDIUM

CROSS-REFERENCE TO RELATED APPLICATIONS

The present Application is a Continuation Application of U.S. patent application Ser. No. 12/219,430, filed on Jul. 22, 2008 now U.S. Pat. No. 8,040,421, the disclosure of which is incorporated herein by reference.

This application claims priority under 35 USC 119 from Japanese Patent Application No. 2007-252395, filed on Sep. 27, 2007, the disclosure of which is incorporated by reference herein.

BACKGROUND OF THE INVENTION

1. Field of the Invention

The present invention relates to an image display device, an image display method, a portable device with a photography function, and a computer readable medium storing an image display program, and more particularly relates to an image display device, image display method, portable device with photography function, and computer readable medium storing an image display program that are for displaying an image in accordance with image data including photography information including position information and attitude angle information, which position information represents a photography position and which attitude angle information represents an attitude angle of a camera at a time of photography.

2. Description of the Related Art

Along with image data of an image photographed by a digital camera or the like, photography information including a photography position, a photography direction and the like at the time of photography is memorized. This photography information is utilized when the image is replayed.

For example, Japanese Patent Application (JP-A) No. 2007-129407 has proposed: memorizing position information and direction information detected at a time of photography together with image data; associating the memorized position information and image data with map data; displaying icons, with direction characteristics, in a map display screen; and, in accordance with selection of a displayed icon, displaying the corresponding image.

Furthermore, JP-A No. 10-233985 has proposed memorizing corresponding GPS information with photographic images and, based on the GPS information, displaying thumbnail images of the photographic images at corresponding positions of a map, which is displayed based on map data.

However, with the technologies of JP-A Nos. 2007-129407 and 10-233985, when photography information such as position information, direction information and the like that is memorized together with image data is used in implementing replay of an image, map data requiring bulky amounts of data is required in addition to the image data and photography information. Moreover, it is not possible to reproduce a sense of place of the time of photography during replay simply by displaying an icon, a thumbnail image or the like, in addition to which it is difficult to intuitively understand positional relationships with other photographs that were taken in the vicinity.

SUMMARY OF THE INVENTION

The present invention has been made in view of the above circumstances and provides an image display device, an image display method, a portable device with a photography function, and a computer readable medium storing an image display program.

According to an aspect of the invention, there is provided an image display device comprising: a display that displays an image based on image data including photography information, the photography information including position information representing a photography position and attitude angle information representing an attitude angle of a camera at a time of photography; an attitude angle detection unit that detects an attitude angle of the display; and a controller that, when the attitude angle of the display is altered while the image according to the image data is displayed, controls the display based on the position information and the attitude angle information of the image displayed at the display and based on the attitude angle detected by the attitude angle detection unit, so as to display an image that was photographed within a predetermined region with respect to the position information of the image displayed at the display and that includes attitude angle information that corresponds to the detected attitude angle.

BRIEF DESCRIPTION OF THE DRAWINGS

Preferred embodiments of the present invention will be described in detail based on the following figures, wherein:

FIG. 3A and FIG. 3B are diagrams showing angles obtained by an electronic compass and an inclination sensor.

FIG. 5 is a diagram showing an example of photography information.

FIG. 6 is a flowchart showing a processing routine in a replay mode of a first exemplary embodiment.

FIG. 7 is a flowchart showing a processing routine of vicinity image searching.

FIG. 8 is a flowchart showing a processing routine of vicinity image position indication.

FIG. 11 is a flowchart showing a processing routine of vicinity image switching display.

FIG. 12 is a flowchart showing a processing routine in a replay mode of a second exemplary embodiment.

FIG. 13 is a flowchart showing a processing routine in a replay mode of a third exemplary embodiment.

FIG. 14 is a flowchart showing a processing routine of direction and distance display of the third exemplary embodiment.

FIGS. 16A and 16B are flowcharts showing a processing routine of vicinity image position indication of a fourth exemplary embodiment.

DETAILED DESCRIPTION OF THE INVENTION

Herebelow, exemplary embodiments of the present invention will be described in detail with reference to the drawings.

First Exemplary Embodiment

Figure 1:
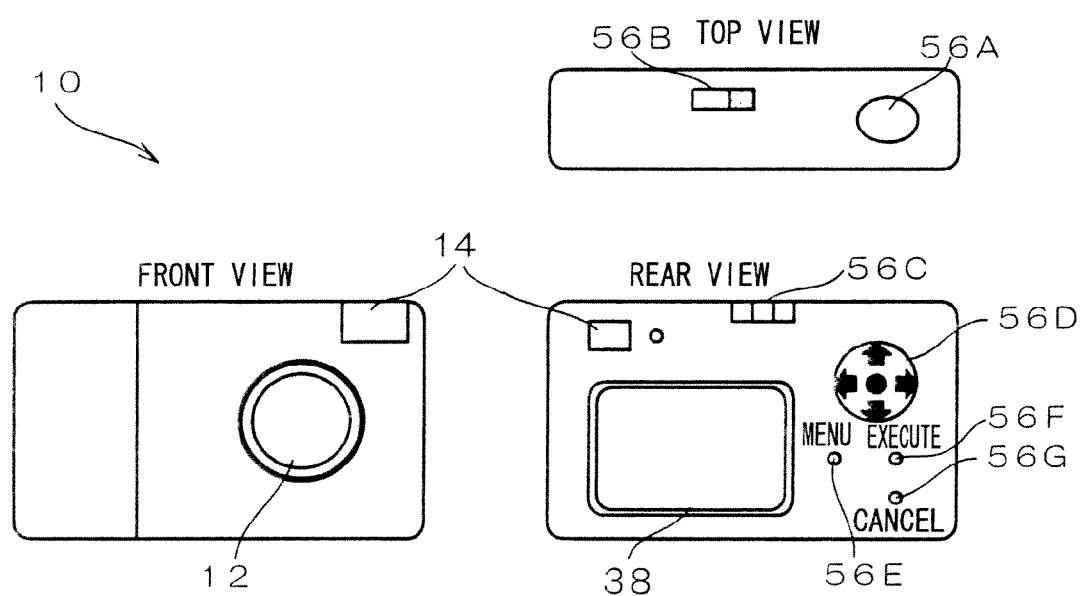
FIG. 1 is exterior views showing exterior structure of a digital camera relating to an exemplary embodiment of the present invention.

For the present exemplary embodiment, a case in which the image display device of the present invention is provided at a digital camera will be described. Firstly, with reference to FIG. 1, exterior structure of a digital camera 10 relating to the present exemplary embodiment will be described.

A lens 12, for focusing a subject image, and a viewfinder 14, which is used for determining the composition of the subject to be photographed, are provided at a front face of the digital camera 10. A release button ("shutter") 56A, which is operated by being pressed by a photographer when photography is to be executed, and a power switch 56B are provided at an upper face of the digital camera 10.

The release button 56A relating to the present exemplary embodiment is structured to be capable of sensing two stages of pressing operation: a state which is pushed down to an intermediate position (below referred to as a half-pressed state), and a state which is pushed down beyond the intermediate position to a bottommost position (below referred to as a fully pressed state).

At the digital camera 10 of the present exemplary embodiment, when the release button 56A is put into the half-pressed state, an AE (automatic exposure) function operates and exposure conditions (shutter speed and an aperture state) are specified, and then an AF (auto focus) function operates to control focusing. Thereafter, when the release button 56A is further put into the fully pressed state, exposure (photography) is carried out.

An eyepiece portion of the aforementioned viewfinder 14, a liquid crystal display (below referred to as an LCD) 38, a mode switch 56C and a cross-cursor button 56D are provided at a rear face of the digital camera 10. The LCD 38 displays images based on digital image data obtained by photography, and various menu screens, messages and the like. The mode switch 56C is operated by sliding to set one of a photography mode, which is a mode for performing photography, and a replay mode, which is a mode for displaying (replaying) at the LCD 38 images based on digital image data obtained by photography. The cross-cursor button 56D is structured to include four arrow keys representing four directions of movement—up, down, left and right—in a display region of the LCD 38.

A menu button 56E, an execute button 56F and a cancel button 56G are also provided at the rear face of the digital camera 10. The menu button 56E is pressed for operation when a menu screen is to be displayed at the LCD 38. The execute button 56F is pressed for operation when processing indicated in a menu screen is to be executed. The cancel button 56G is pressed for operation when various operations are to be stopped (canceled).

Figure 2:
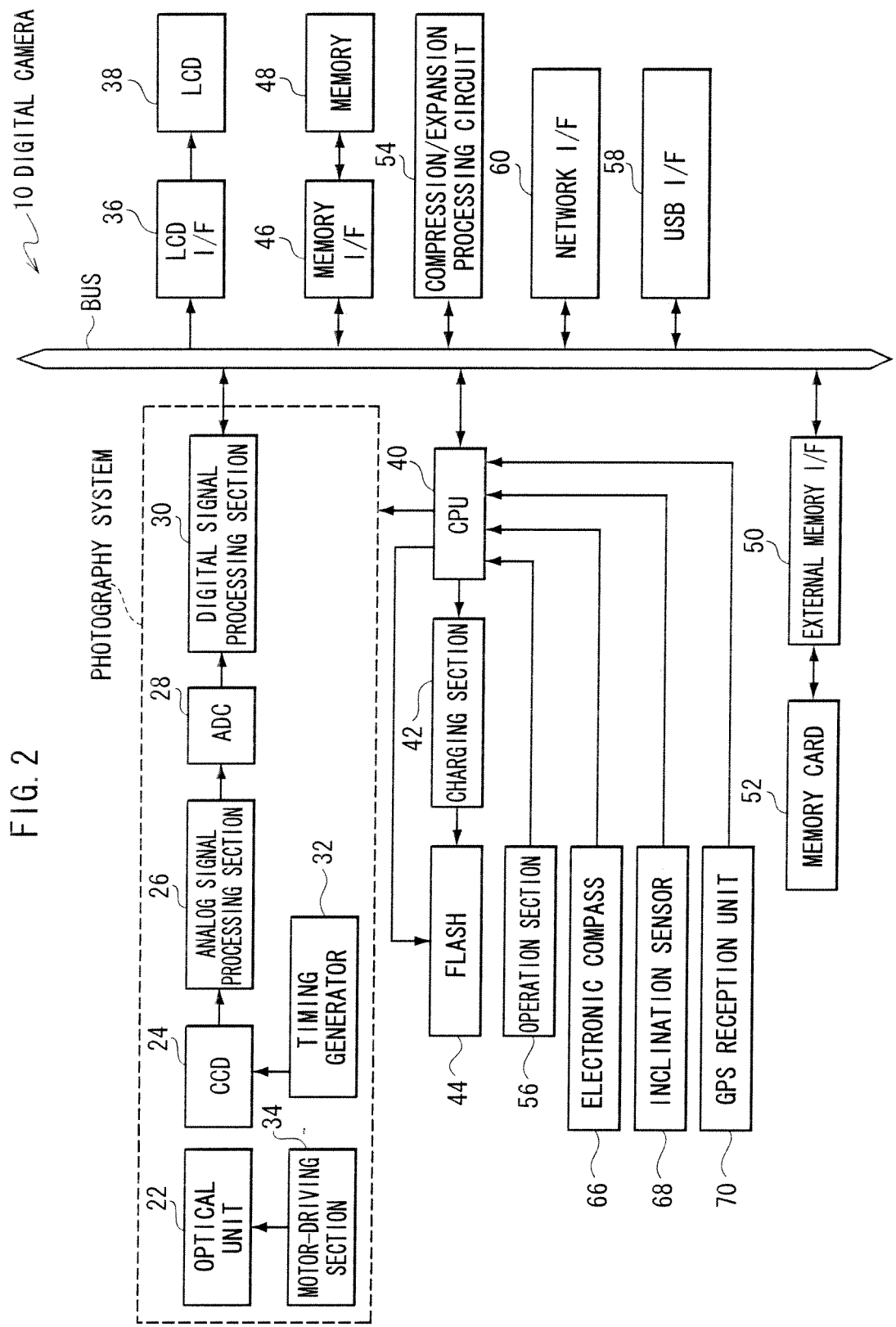
FIG. 2 is a block diagram showing structure of the digital camera relating to the exemplary embodiment of the present invention.

Next, structure of an electronic system of the digital camera 10 relating to the present exemplary embodiment will be described with reference to FIG. 2.

The digital camera 10 is structured to include an optical unit 22, a charge coupling device (below referred to as a CCD) 24, and an analog signal processing section 26. The optical unit 22 is structured to include the aforementioned lens 12. The CCD 24 is disposed to rearward on an optical axis of the lens. The analog signal processing section 26 performs various kinds of analog signal processing on analog signals that are inputted thereto.

The digital camera 10 is also structured to include an analog/digital converter (below referred to as an ADC) 28 and a digital signal processing section 30. The ADC 28 converts inputted analog signals to digital signals. The digital signal processing section 30 performs various kinds of digital signal processing on digital data that is inputted thereto.

The digital signal processing section 30 incorporates a line buffer with a predetermined capacity, and performs control to directly memorize the inputted digital data at a predetermined region of a memory 48, which will be described later.

An output terminal of the CCD 24 is connected to an input terminal of the analog signal processing section 26, an output terminal of the analog signal processing section 26 is connected to an input terminal of the ADC 28, and an output terminal of the ADC 28 is connected to an input terminal of the digital signal processing section 30. Thus, analog signals representing a subject image that are outputted from the CCD 24 are subjected to predetermined analog signal processing by the analog signal processing section 26, are converted to digital image data by the ADC 28, and are then inputted to the digital signal processing section 30.

The digital camera 10 is further structured to include an LCD interface 36, a CPU (central processing unit) 40, the memory 48, a memory interface 46, a network I/F (interface) 60 and a USB I/F (interface) 58. The LCD interface 36 generates signals for displaying subjects, menu screens and the like at the LCD 38, and provides the signals to the LCD 38. The CPU 40 administers operations of the digital camera 10 as a whole. The memory 48 memorizes digital image data obtained by photography and the like. The memory interface 46 implements control of access to the memory 48.

The digital camera 10 is yet further structured to include an external memory interface 50, for enabling access by the digital camera 10 to a portable memory card 52, and a compression/expansion processing circuit 54, which performs compression processing and expansion processing on digital image information.

For the digital camera 10 of the present exemplary embodiment, VRAM (Video RAM), SRAM, DRAM, Flash memory or the like is employed as the memory 48, and an xD Picture Card (registered trademark) is employed as the memory card 52.

The digital signal processing section 30, the LCD interface 36, the CPU 40, the memory interface 46, the external memory interface 50, the compression/expansion processing circuit 54, the network I/F 60 and the USB I/F 58 are connected to one another through a system bus. Accordingly, the CPU 40 can implement control of operations of the digital signal processing section 30 and the compression/expansion processing circuit 54, display of various kinds of information at the LCD 38 via the LCD interface 36, and control of access to the memory 48 and the memory card 52 via the memory interface 46 and the external memory interface 50.

The digital camera 10 is also provided with a timing generator 32 that generates timing signals, principally for driving the CCD 24, and provides the timing signals to the CCD 24. Driving of the CCD 24 is controlled by the CPU 40, via the timing generator 32.

The digital camera 10 is still further provided with a motor-driving section 34. An unillustrated focus adjustment motor, zoom motor and aperture driving motor are provided at the optical unit 22. Driving of these motors is controlled by the CPU 40, via the motor-driving section 34.

The lens 12 relating to the present exemplary embodiment includes a plurality of lenses, is structured as a zoom lens with which alterations of focusing distance (changes in magnification) are possible, and is equipped with an unillustrated lens-driving mechanism. The above-mentioned focus adjustment motor, zoom motor and aperture driving motor are included in this lens-driving mechanism. These motors are each driven by driving signals provided from the motor-driving section 34 in accordance with control by the CPU 40.

The aforementioned release button 56A, power switch 56B, mode-switching switch 56C, cross-cursor button 56D, menu button 56E, execute button 56F and cancel button 56G (collectively referred to as an operation section 56 in FIG. 2) are also connected to the CPU 40. Thus, the CPU 40 can continuously identify operational states of the operation section 56.

The digital camera 10 is still further equipped with a charging section 42, which is interposed between a flash 44 and the CPU 40, and supplies power in accordance with control by the CPU 40 for causing the flash 44 to emit light. The flash 44 is also connected to the CPU 40 and light emission from the flash 44 is controlled by the CPU 40.

An electronic compass 66, an inclination sensor 68 and a GPS (Global Positioning System) reception unit 70 are connected to the CPU 40.

The CPU 40 detects bearing information, which represents a bearing in which the digital camera 10 is oriented, from the electronic compass 66, in the form of an angle with respect to a predetermined bearing. The CPU 40 detects inclination information, which represents an extent to which the digital camera 10 is inclined from the horizontal, from the inclination sensor 68, in the form of an angle.

More specifically, as shown in FIG. 3A, the electronic compass 66 detects a bearing to which the digital camera 10 is oriented as an angle θ with, for example, a northerly direction being the reference direction and, turning to rightward, north being 0°, east being 90°, south being 180° and west being 270°. As shown in FIG. 3B, the inclination sensor 68 detects an inclination of the digital camera 10 to upward relative to the horizontal as an angle φ, and an inclination to downward as an angle-φ.

The CPU 40 also acquires time and date information from a built-in clock and position information from the GPS reception unit 70. The position information indicates a position of the digital camera 10 represented by latitude and longitude. Although latitude and longitude serve as the position information in the present exemplary embodiment, the position information may also include altitude.

Figure 4:
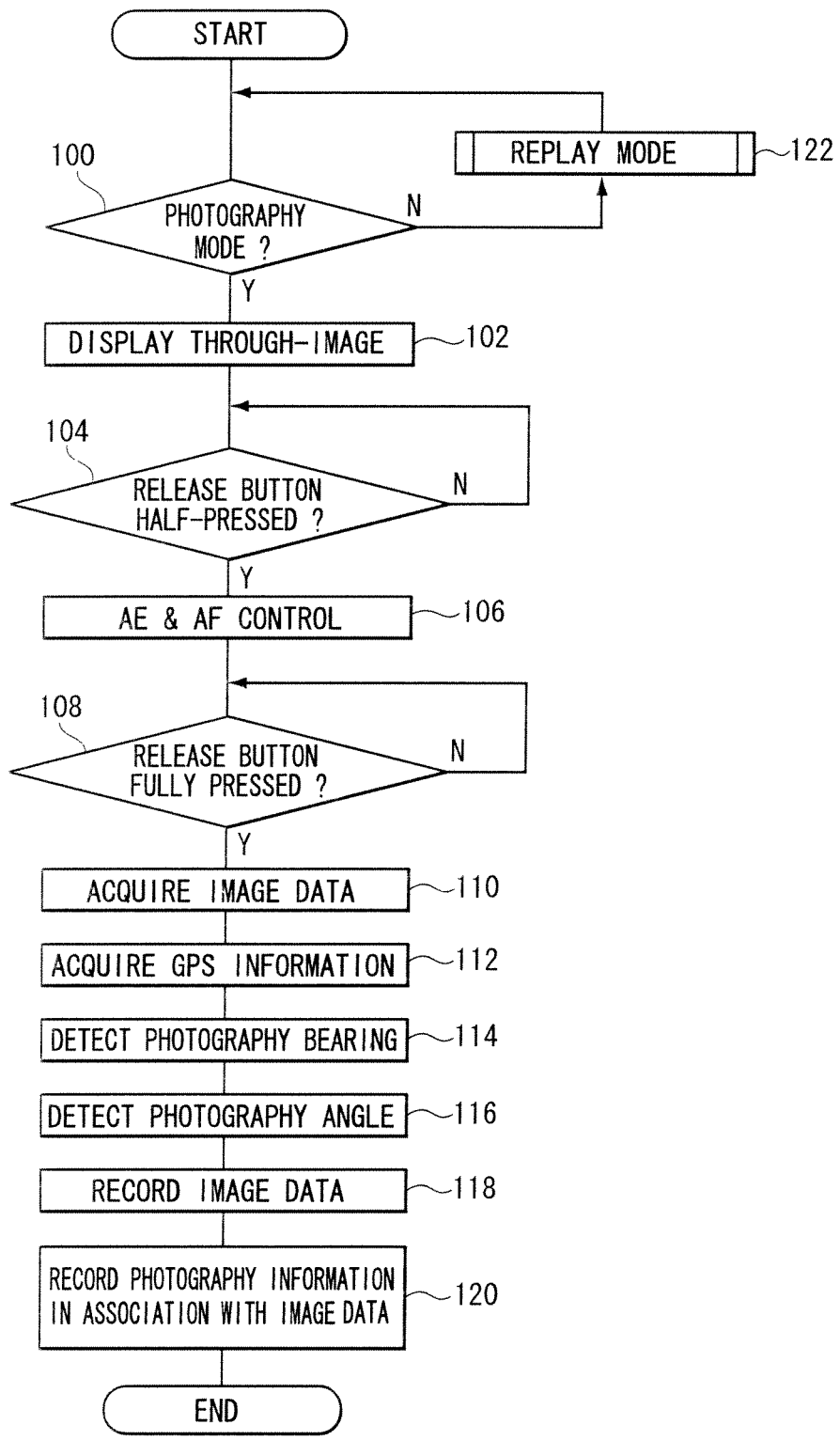
FIG. 4 is a flowchart showing a processing routine at a time of photography.

Next, a processing routine at a time of photography of the digital camera 10 relating to the present exemplary embodiment will be described with reference to FIG. 4. This routine starts when the power switch 56B is operated and the power is switched on.

In step 100, it is judged whether or not the photography mode has been selected by switching of the mode switch 56C. If the photography mode has been selected, the routine advances to step 102. If the photography mode has not been selected then, the replay mode having been selected, the routine advances to step 122.

In step 102, a moving image (through-image) obtained by continuous imaging by the CCD 24 is displayed at the LCD 38. For display of the through-image, analog signals for each of R (red), G (green) and B (blue) representing a subject, which is focused on the CCD 24 through the optical unit 22, are subjected to analog signal processing in the analog signal processing section, such as correlated double sampling processing and the like, and are sequentially outputted to the ADC 28. The ADC 28 converts the respective analog signals of R, G and B that are inputted from the analog signal processing section 26 to respective 12-bit digital signals of R, G and B, and sequentially outputs the digital signals to the digital signal processing section 30. The digital signal processing section 30 performs white balance adjustment and performs gamma processing and sharpness processing, to create digital image data with a predetermined number of bits, for example, 8 bits. The digital signal processing section 30 also applies YC signal processing to generate a luminance signal Y and chroma signals Cr and Cb (below referred to as YC signals), and stores the YC signals to a predetermined region of the memory 48. The digital signal processing section 30 also outputs the generated YC signals to the LCD 38 sequentially, via the LCD interface 36.

Then, in step 104, it is judged whether or not the release button 56A is in the half-pressed state. When the release button 56A is in the half-pressed state, the routine advances to step 106, and while the release button 56A is not in the half-pressed state, the routine waits for the half-pressed state.

In step 106, exposure conditions are specified by the AE function, and then focusing control is performed by the AF function. The routine advances to step 108, and it is judged whether or not the release button 56A is in the fully pressed state. When the release button 56A is in the fully pressed state, the routine advances to step 110, and while the release button 56A is not in the fully pressed state, the routine waits for the fully pressed state.

In step 110, the image data (YC signals) stored in the memory 48 at the point in time at which the release button 56A was fully pressed is acquired, and is compressed into a predetermined compression format (JPEG format in the present exemplary embodiment) by the compression/expansion processing circuit 54.

Then, in step 112, a date and time is acquired from the built-in clock, and a current position of the digital camera 10 at the time of photography is acquired from the GPS reception unit 70. Next, in step 114, a bearing at the time of photography is sensed by the electronic compass 66. Then, in step 116, a photography angle at the time of photography is sensed by the inclination sensor. The bearing and photography angle correspond to an attitude angle.

Next, in step 118, the image data that was compressed in step 110 is recorded to the memory card 52 via the external memory interface 50. If the memory card 52 is not provided, the image data is recorded to the memory 48.

Then, in step 120, the information of the photography date and time, photography position, photography bearing and photography angle, which has been acquired and detected in step 112 to step 116, is recorded to the memory card 52 as photography information, in association with a filename which is automatically assigned to the image data. This photography information is memorized, for example, in a format as shown in FIG. 5, being assigned with ID numbers in numerical order from the image data with the oldest photography date and time.

If, in step 100, the replay mode has been selected by switching of the mode switch 56C, the judgment is negative, the routine advances to step 122 and processing transfers to the replay mode processing routine shown in FIG. 6.

Next, the replay mode processing routine of the present exemplary embodiment will be described with reference to FIG. 6 to FIG. 9.

In step 200, as an initial operation of a usual replay mode, photography information recorded in the memory card 52 is consulted, and the oldest image data in the image data that is recorded (i.e., with the smallest ID number) is read out. The image data is subjected to expansion processing by the compression/expansion processing circuit 54, and is then displayed at the LCD 38. In the case in which the photography information shown in FIG. 5 has been recorded in the memory card 52, image P1 with ID number 1 is displayed.

Then, in step 202, of replay modes, it is judged whether or not a direction indication mode has been selected. Selection of the direction indication mode is implemented by pressing the menu button 56E to display a main menu at the LCD 38 and, in a state in which a corresponding menu item has been selected in the displayed menu by operation of the cross-cursor button 56D, pressing the execute button 56F. If the direction indication mode has been selected, the routine advances to step 204, and if the direction indication mode has not been selected, the routine advances to step 218.

In step 204, a photography position (Xm,Ym) of an image Pm that is being displayed at the LCD 38 is read from the photography information. The routine then advances to step 206, and vicinity image search processing is executed.

FIG. 7 is a flowchart showing a processing routine of the vicinity image searching. Herein, vicinity images means images that were photographed within a predetermined range, with a radius of a predetermined value L, with respect to the photography position of the image Pm that is being displayed.

In step 300, a counter value i is set to 0, and in a next step 302, the counter value i is incremented by 1.

Then, in step 304, the photography information is consulted, and the ID number m of the image Pm being displayed is compared with the counter value i. If these are different, the routine advances to step 306, and if they are the same, the image Pm being displayed serves as a vicinity image and there is no need to search. Accordingly, the routine advances to step 318.

In step 306, a photography position (Xi,Yi) of an image Pi is read from the photography information. In step 308, a distance between (Xm,Ym) and (Xi,Yi) is calculated, and it is judged whether or not the calculated value is smaller than the predetermined value L (for example, 10 m). The predetermined value L may be set to a predetermined value by operation of the menu button 56E, the cross-cursor button 56D and the execute button 56F. The size of a predetermined region that contains vicinity images can be altered by changing the predetermined value L. If the calculated value is smaller than the predetermined value L, the routine advances to step 310, and if greater than the predetermined value L, the image Pi does not correspond to a vicinity image, and accordingly the judgment is negative and the routine advances to step 318.

In step 310, it is judged whether or not a date and time range setting, for whether or not an image is to be included in vicinity images depending on photography date and time, is present. If there is a date and time range setting, the routine advances to step 312, the photography information is consulted, and a photography date and time Ti of the image Pi is acquired. In step 314, it is determined whether or not the photography date and time Ti of the image Pi is included in the specified date and time range.

If there is no date and time range setting, or if the photography date and time Ti of the image Pi is contained in the specified date and time range, the routine advances to step 316, and the ID number of the image Pi is memorized in the memory 48. Here, rather than the ID number, the filename of the image data may be memorized in the memory 48. If the date and time Ti of the image Pi is not contained in the date and time range, the routine advances to step 318.

Herein, the presence or absence of the date and time range setting, and the date and time range, may be set by operation of the menu button 56E, the cross-cursor button 56D and the execute button 56F, and a specified date and time range can be altered similarly.

In step 318, it is judged whether or not the counter value i has reached a maximum value of ID numbers of the photography information, and thus it is judged whether or not there is a subsequent image. If there is a subsequent image, the routine returns to step 302, the counter value i is incremented, and the processing from step 304 onward is executed for the next image. If there is not a subsequent image, the vicinity image searching ends and the routine returns.

Then, the routine advances to step 208 of FIG. 6, the photography information is consulted, and a photography bearing Dm and photography angle Am of the image Pm being displayed are read. Next, the routine advances to step 210, and processing for vicinity image position indication is executed. FIG. 8 is a flowchart showing a processing routine of vicinity image position indication.

In step 400, it is judged whether an ID number of an image that has been found to be a vicinity image has been memorized in the memory 48. If none have been memorized, in step 426, a message indicating that there are no vicinity images corresponding to the image Pm being displayed is shown at the LCD 38, and the routine advances to step 216 of FIG. 6. If any ID numbers have been memorized, the routine advances to step 402.

In step 402, it is judged whether or not there is a vicinity image that was photographed with a leftward photography bearing relative to the photography bearing Dm of the image Pm being displayed. For this judgment, the photography bearing Dm of the image Pm being displayed serves as a reference, an image that was photographed with a bearing in a range of Dm±α (α being, for example, 45°) is judged to be a frontward vicinity image, an image that was photographed with a bearing in a range from Dm+α to Dm+α+β (β being, for example, 90°) is judged to be a rightward vicinity image, an image that was photographed with a bearing in a range from Dm−α−β to Dm−α is judged to be a leftward vicinity image, and an image that was photographed with a bearing in a range from Dm+α+β to Dm−α−β is judged to be a rearward vicinity image.

If there is a leftward vicinity image, the routine advances to step 404, and if there is not, the routine advances to step 406. In step 404, an icon indicating that there is a vicinity image to leftward is displayed superimposed with the image Pm. In the present exemplary embodiment, an arrow is used as the icon, and the arrow is oriented to show the direction in which the image is present.

For example, if the image Pm being displayed is the image P1 with ID number 1 shown in FIG. 5 and, in the vicinity image search processing, the ID numbers 2 (image P2), 3 (image P3) and 4 (image P4) shown in FIG. 5 have been memorized at the memory 48 as vicinity images of the image P1, specific processing in step 402 and step 404 is as follows.

The photography bearing D1 of image P1 is 270° and the photography angle A1 is 0°, the photography bearing D2 of image P2 is 320° and the photography angle A2 is −90°, the photography bearing D3 of image P3 is 90° and the photography angle A3 is 70°, and the photography bearing D4 of image P4 is 180° and the photography angle A4 is 0°. The respective photography bearings have the relationships shown in FIG. 9A, and the photography angles have the relationships shown in FIG. 9B.

Figure 9A:
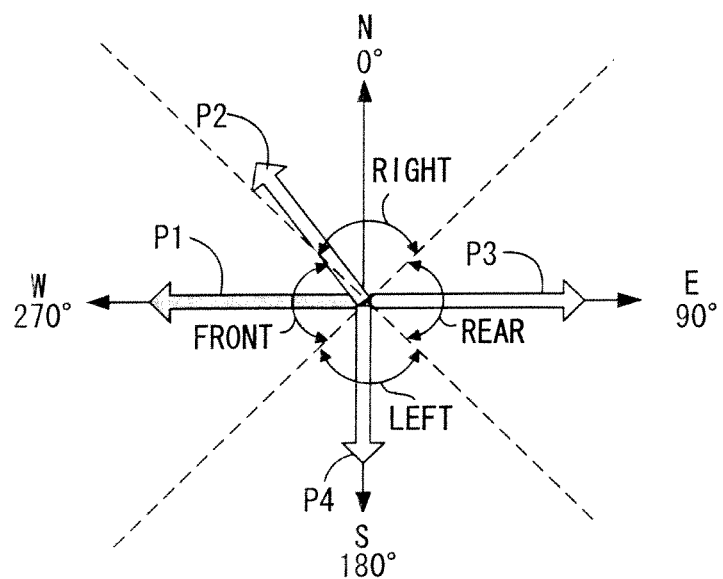
FIG. 9A and FIG. 9B are diagrams for explaining relationships between photography bearings and photography angles of vicinity images.
Figure 9B:
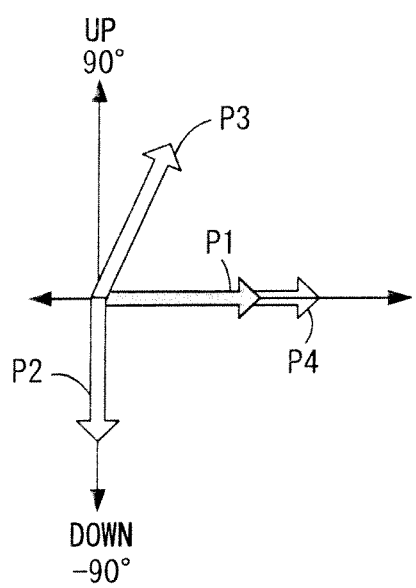

Image P1 has the photography bearing D1 of 270°; that is, as shown in FIG. 9A, image P1 was photographed facing west. Measuring from the photography bearing D1 of the image P1, a range of photography bearings corresponding to leftward vicinity images is, for example, photography bearings from 135° to 225°. Similarly, photography bearings from 315° to 360° and from 0° to 45° are for rightward vicinity images, photography bearings from 45° to 135° are for rearward vicinity images, and photography bearings from 225° to 315° are for frontward vicinity images.

Figure 10A:
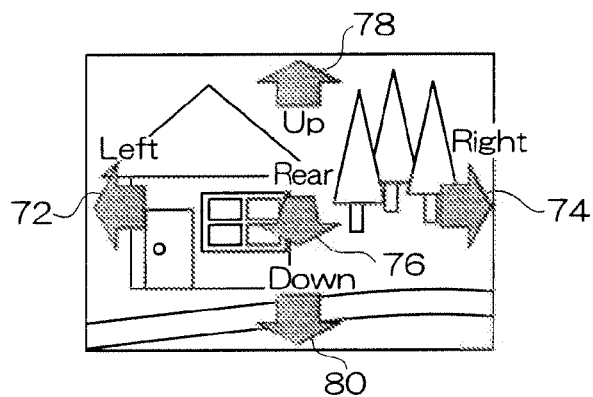
FIG. 10A to FIG. 10D are examples of screens which are displayed by the vicinity image search processing of the first exemplary embodiment.

The ID numbers memorized in the memory 48 and the photography information recorded in the memory card 52 are consulted, and images with the above-mentioned photography bearings corresponding to leftward vicinity images are searched for. As a leftward vicinity image of image P1, there is the image P4 with the photography bearing of 180°. Therefore, the judgment is positive and the routine advances to step 404. As shown in FIG. 10A, a leftward arrow 72 is displayed superimposed with the image P1 that is being displayed at the LCD 38.

Then, in step 406, it is judged whether or not there is a rightward vicinity image, in a similar manner to step 402. Because the image P2 with the photography bearing of 320° is present, the judgment is positive, and in step 408, similarly to step 404, a rightward arrow 74 is displayed.

In a similar manner to step 402 and step 404, frontward vicinity images are processed for in step 410 and step 412 and rearward vicinity images are processed for in step 414 and step 416. Because image P3 is present, a rearward arrow 76 is displayed.

Then, in step 418, it is judged whether or not there are vicinity images that were photographed with photography angles to upward relative to the photography angle A1 of the image P1 that is being displayed. For this judgment, an image that was photographed with a photography angle being a larger value than the photography angle Am of the image Pm being displayed is judged to be an upward vicinity image, and an image that was photographed with a photography angle being a smaller value is judged to be a downward vicinity image.

For example, the photography angle A1 of image P1 is 0°, and image P3 with a photography angle of 70° is present. Therefore, the judgment is positive, the routine advances to step 420, and an upward arrow 78 is displayed. Step 422 and step 424 process for downward vicinity images in a similar manner to step 418 and step 420. Because image P2 with a photography angle of −90° is present, a downward arrow 80 is displayed. The processing ends and the routine returns.

Then, the routine advances to step 212 of FIG. 6, and processing for vicinity image switching display is executed. FIG. 11 is a flowchart showing a processing routine of vicinity image switching display.

In step 500, a bearing representing a direction to which the digital camera 10 is oriented is sensed by the electronic compass 66 and an inclination angle representing an inclination to upward or downward of the digital camera 10 is sensed by the inclination sensor 68. By judging whether the bearing and inclination have changed, it is judged whether or not a turn of the digital camera 10 has been detected. If a turn is detected, the routine advances to step 502, and if no turn is detected, the routine waits until a turn is detected.

In step 502, based on a bearing and inclination of the digital camera 10 before the turn and the bearing and inclination of the digital camera 10 after the turn, a turn direction d and turn angle $\chi$ are calculated. Here, the bearing and inclination of the digital camera 10 before the turn are values that were detected at a point in time at which the vicinity image search processing was being performed.

Then, in step 504, it is judged whether or not there is a vicinity image in a direction in the turning direction d relative to the image Pm being displayed. If there is, the routine advances to step 506, and if there is not, the routine returns to step 500 and detection of turning of the camera continues. For example, in the case of the above-described example in which the vicinity images with ID numbers 2, 3 and 4 have been detected and, as shown in FIG. 10A, arrows are displayed indicating that there are vicinity images to leftward, rightward, rearward, upward and downward, if it is calculated in step 502 that the turn direction d is to downward, then because the vicinity image P2 is present to downward, this judgment is positive.

In step 506 it is judged whether or not there is a vicinity image in a direction turned by the turn angle $\chi$ to the turn direction d. In a case in which there is a vicinity image with, in the photography information, a photography angle or photography bearing representing a direction that is turned by the turn angle $\chi$ from the photography angle or photography bearing of the image Pm being displayed, the judgment is positive. Here, the judgment may be positive if a predetermined range of angles is entered rather than the photography angle or photography bearing of the vicinity image actually being matched.

For example, in the example described above, it is specified that the judgment is positive if the digital camera 10 is turned to within 20° either way of the photography angle of a vicinity image. If the turn angle $\chi$ is calculated to be 45° in step 502, then even though the digital camera 10 is turned 45° downward from the photography angle 0° of the image P1 that is being displayed, this is not in a range within ±20° of the photography angle −90° of the vicinity image P2. Therefore, the judgment is negative, the processing returns to step 500 and detection of turning of the camera continues. If the turn angle x is calculated to be 80° to downward, this is in a range within ±20° of the photography angle −90° of the vicinity image P2, the judgment is positive, and the routine advances to step 508.

In step 508, it is judged whether or not there is only one corresponding vicinity image. If there are plural corresponding vicinity images, the routine advances to step 510. The photography information is consulted and, of the corresponding vicinity images, the image with the most recent photography date and time is selected, and the routine advances to step 512. If there is only one corresponding vicinity image, the routine simply advances to step 512.

In step 512, the corresponding vicinity image is read from the memory card 52 and displayed at the LCD 38. The routine returns and advances to step 214 of FIG. 6.

In step 214 of FIG. 6, it is judged whether or not the direction indication mode is to end. Ending of the direction indication mode is implemented by pressing the menu button 56E to display the main menu at the LCD 38 and operating the cross-cursor button 56D and the execute button 56F. The direction indication mode may also be ended by pressing the cancel button 56G. If the direction indication mode is to end, the routine advances to step 216, and if the direction indication mode is not to end, the routine returns to step 204, and the processing from step 204 onward is executed for a newly displayed image Pm.

For example, in the example described above, from the state in which the results of vicinity image searching for image P1 are displayed as shown in FIG. 10A, if the digital camera 10 has been turned 80° downward and image P2 has been displayed, the photography position of image P2 (X2, Y2) is read in step 204, and in step 206 vicinity image search processing for image P2 is executed. Here, if the ID numbers 1,3 and 4 shown in FIG. 5 are found as vicinity images, then in step 208, the photography bearing D2 and photography angle A2 of image P2 are read, the vicinity image position indication processing is executed in step 210, and as shown in FIG. 10B, the leftward arrow 72, the rightward arrow 74, the rearward arrow 76 and the upward arrow 78 are displayed superimposed with the image P2.

Figure 10B:
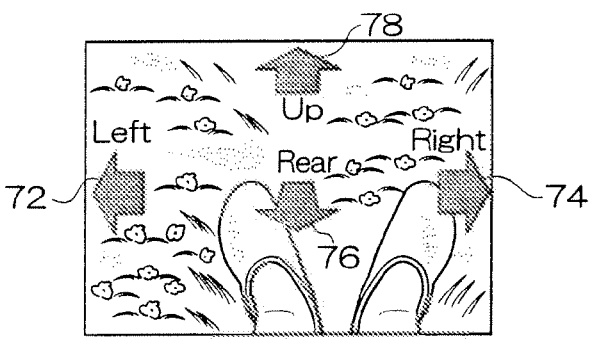
Figure 10C:
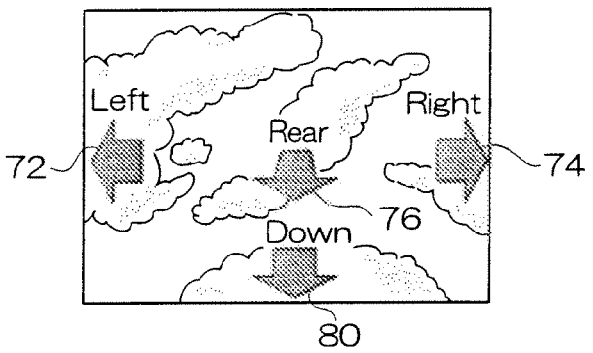
Figure 10D:
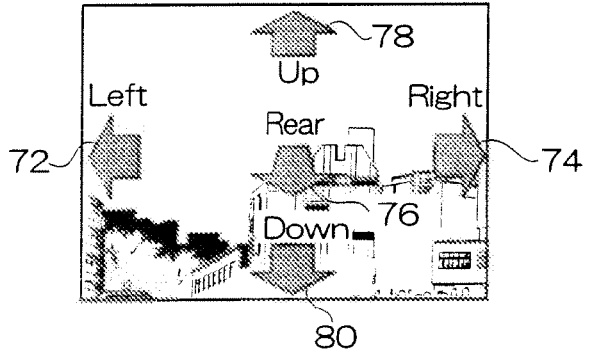

Display as in FIG. 10B is similarly implemented if the digital camera 10 is turned to rightward from the state shown in FIG. 10A. If the digital camera 10 is turned to upward or rearward from the state shown in FIG. 10A, then as shown in FIG. 10C, the leftward arrow 72, the rightward arrow 74, the rearward arrow 76 and the downward arrow 80 are displayed superimposed with image P3. If the digital camera 10 is turned to leftward from the state shown in FIG. 10A, the leftward arrow 72, the rightward arrow 74, the rearward arrow 76, the upward arrow 78 and the downward arrow 80 are displayed superimposed with image P4.

If it is judged in step 214 that the direction indication mode is to end, then in the next step 216, the display of arrows on the image is removed, the direction indication mode ends, and the digital camera 10 returns to the usual replay mode. At this time, similarly to step 200, as the initial operation of the usual display mode, the oldest image data may be read and displayed, or the image that was being displayed immediately prior to the direction indication mode ending may be kept displayed.

Then, in step 218, it is judged whether or not a left key or a right key of the cross-cursor button 56D has been pressed. Thus, it is judged whether or not a frame feed operation has been performed. If there is a frame feed operation, the routine advances to step 220. If the right key has been pressed, the photography information is consulted, the ID number is incremented, and the next image is read. If the left key has been pressed, the ID number is decremented and the next image is read. The routine returns to step 200, and the image that has been read is displayed at the LCD 38.

If there has not been a frame feed operation, the routine advances to step 222, and it is judged whether or not the replay mode is to end. If the mode switch 56C has been switched to the photography mode or power has been turned off with the power switch 56B, the replay mode ends. If the replay mode is not to end, the routine returns to step 202.

Thus, it is possible, by changing an orientation bearing and an upward/downward inclination of the digital camera 10, to display vicinity images of an image that is being displayed, based on position information such as photography bearings, photography angles and the like that has been recorded in association with image data. Therefore, bulky data such as map data is not required, a sense of place at the time of photography can be reproduced, and relative positional relationships between the image being displayed and the vicinity images can be intuitively grasped.

Second Exemplary Embodiment

For the first exemplary embodiment, a case has been described in which vicinity images are indicated by relative relationships of photography bearings with reference to an image that is being displayed. For the second exemplary embodiment however, a case will be described in which vicinity images are indicated based on absolute bearings with respect to a current position. Structures, in the structure of a digital camera of the second exemplary embodiment, that are the same as structures of the digital camera 10 of the above-described first exemplary embodiment, and processes that are the same, will be assigned the same reference numerals, and illustrations and descriptions thereof will not be given. A processing routine of a replay mode of the second exemplary embodiment will be described with reference to FIG. 12.

In step 200, as an initial operation of a usual replay mode, the oldest image data is displayed at the LCD 38. Then, in step 202, of replay modes, if a direction indication mode has been selected, the routine advances to step 600, and display of the image that is being displayed temporarily ends.

Next, in step 602, a current position of the digital camera 10 (Xm,Ym) is read from GPS information which has been received by the GPS reception unit 70. The routine then advances to step 206, and the vicinity image search processing is executed. Vicinity images here means images that were photographed within a predetermined range with respect to the current position of the digital camera 10.

Then, the routine advances to step 604 of FIG. 12, a bearing θm representing a direction to which the digital camera 10 is oriented, which is sensed by the electronic compass 66, is acquired, and an upward/downward inclination φm of the digital camera 10, which is sensed by the inclination sensor 68, is acquired. Then, the routine advances to step 210, and the vicinity image position indication processing is executed.

Thus, if—according to the photography positions, photography bearings and photography angles that have been recorded in association with image data and the current position of the digital camera 10, the bearing representing the direction in which the digital camera 10 is oriented and the inclination angle of the digital camera 10—the digital camera 10 is oriented in a direction the same as when a vicinity image was photographed, then the vicinity image is displayed with reference to the current position of the digital camera 10. Therefore, it is possible to display images that were previously photographed at the same place, images that were photographed on days with different weather conditions and the like while, for example, comparing them with the current scene, and it is possible to reproduce a sense of place of the time of photography.

Third Exemplary Embodiment

For the first exemplary embodiment and the second exemplary embodiment, cases have been described in which vicinity images, with respect to a photography position of an image being displayed or a current position, are displayed. For the third exemplary embodiment however, a case will be described in which a photography bearing and a photography position of an image that is being displayed are indicated, measuring from a current position. Structures, in the structure of a digital camera of the third exemplary embodiment, that are the same as structures of the digital camera 10 of the above-described first exemplary embodiment, and processes that are the same, will be assigned the same reference numerals, and illustrations and descriptions thereof will not be given. A processing routine of a replay mode of the third exemplary embodiment will be described with reference to FIG. 13 and FIG. 14.

In step 202, if a direction indication mode is selected, the routine advances to a next step 700, the photography information is consulted, and the photography position (Xm,Ym) and photography bearing Dm of an image Pm that is being displayed are read.

Then, in step 702, a current position of the digital camera 10 (Xn,Yn) is read from GPS information which has been received by the GPS reception unit 70. The routine advances to a next step 704, and a bearing θn representing a direction in which the digital camera 10 is oriented, which is sensed by the electronic compass 66, is acquired. The routine advances to a next step 706, and direction and distance display processing is executed. FIG. 14 is a flowchart showing a processing routine for direction and distance display.

In step 800, it is judged whether or not the photography bearing Dm of the image Pm being displayed is at the left side relative to the bearing to which the digital camera 10 is currently oriented, which is represented by the bearing θn. If it is to the left side, the routine advances to step 802, and an icon indicating that the photography bearing Dm of the image Pm being displayed is to the left side is displayed superimposed with the image Pm. In the present exemplary embodiment, an arrow is used as the icon, and a direction in which the arrow is oriented shows the direction to which the image is present. If the bearing Dm is not to the left side, then in subsequent steps it is similarly judged whether the image is to the right side, to the rear side or to the front side, and an arrow with the corresponding orientation is displayed (steps 804 to 812).

Figure 15:
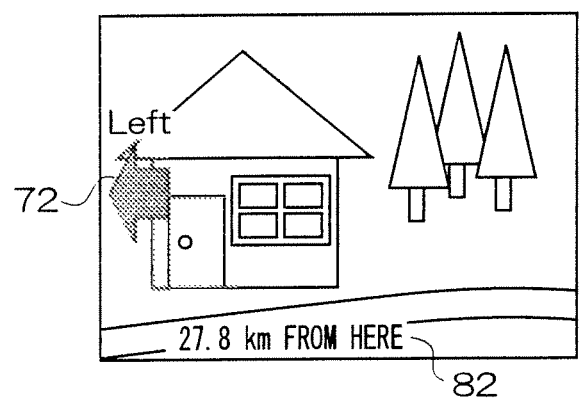
FIG. 15 is an example of a screen displayed by the direction and distance display processing.

For example, if the image Pm being displayed is the image P1 with ID number 1 shown in FIG. 5 and the bearing θn representing the bearing to which the digital camera 10 is currently oriented is 0° (northward), the photography bearing D1 of the image P1 is 270° (westward). Therefore, relative to the bearing θn representing the bearing to which the digital camera 10 is currently oriented, it is judged that the photography bearing D1 of image P1 is to the left side and, as shown in FIG. 15, the leftward arrow 72 is displayed.

Next, the routine advances to step 814, and a distance between the photography position of the image Pm being displayed (Xm,Ym) and the current position of the digital camera 10 (Xn,Yn) is calculated. A distance display 82 is displayed, which shows how far distant the image Pm being displayed is from the current position. Then, the routine returns.

Next, the routine advances to step 708 of FIG. 13, and it is judged, from the GPS information received by the GPS reception unit 70, whether or not a current position of the digital camera 10 has changed since a point in time at which the direction and distance display processing was executed. If the current position has changed, the routine returns to step 702. If the current position has not changed, the routine advances to step 710, and it is judged whether or not a bearing θn representing the bearing to which the digital camera 10 is oriented, which is sensed by the electronic compass 66, has changed since the point in time at which the direction and distance display processing was executed. If the bearing θn has changed, the routine returns to step 702. If the bearing θn has not changed, the routine advances to step 214.

Thus, it can be understood how far distant from a current position and in which direction the image being displayed was photographed. Accordingly, for example, an image showing a target location which was previously photographed is displayed, and by moving in accordance with the arrow display and distance display while altering the bearing to which the digital camera 10 is oriented, it is possible for a user to reach the target location, without bulky data such as map data being required.

Fourth Exemplary Embodiment

For the fourth exemplary embodiment, a case will be described in which an arrow is used as an icon which is displayed in vicinity image position indication processing, a direction in which the vicinity image is present is shown by the direction in which the arrow is oriented, and an amount of change in bearing required in order to display the vicinity image is shown by length of the arrow. Structures, in the structure of a digital camera of the fourth exemplary embodiment, that are the same as structures of the digital camera 10 of the above-described first exemplary embodiment, and processes that are the same, will be assigned the same reference numerals, and illustrations and descriptions thereof will not be given. A processing routine of vicinity image position indication of the fourth exemplary embodiment will be described with reference to FIGS. 16A and 16B.

If it is judged in step 402 that there is a vicinity image that was photographed with a photography bearing to leftward relative to the photography bearing Dm of an image Pm that is being displayed, the routine advances to step 900. Of vicinity images to leftward, a vicinity image Pi for which the photography bearing Di is closest to the photography bearing Dm of the image being displayed is selected.

Next, in step 902, a difference between the photography bearing Dm of image Pm and the photography bearing Di of image Pi is calculated, and an arrow length that corresponds to the calculated difference is determined. The arrow length is longer when the difference is greater. The arrow length may progressively change in proportion to the difference, and may change stepwise. From step 406 onward, similar processing is performed for vicinity images to rightward, upward and downward.

Figure 17:
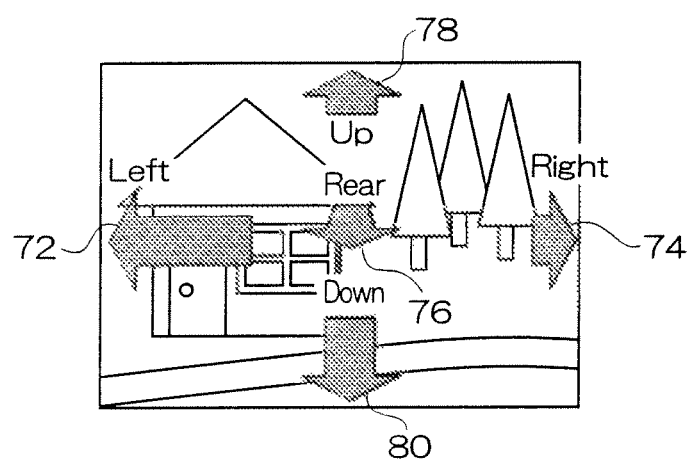
FIG. 17 is an example of a screen displayed by vicinity image search processing of the fourth exemplary embodiment.

For example, in a case in which, relative to image P1 with ID number 1 shown in FIG. 5, image P2, image P3 and image P4 are found as vicinity images, the difference between the photography bearing D4 of P4, which is a leftward vicinity image, and the photography bearing D1 of image P1 is 90°, and the difference between the photography bearing D2 of P2, which is a rightward vicinity image, and the photography bearing DI of image P1 is 50°. Therefore, as shown in FIG. 17, the leftward arrow 72 is displayed as a longer arrow than the rightward arrow 74. Further, the difference between the photography angle A3 of P3, which is an upward vicinity image, and the photography angle A1 of image P1 is 70°, and the difference between the photography angle A2 of P2, which is a downward vicinity image, and the photography angle A1 of image P1 is 90°. Thus, the downward arrow 80 is displayed as a longer arrow than the upward arrow 78.

Thus, the length of an arrow that is displayed changes in accordance with a difference between a photography bearing or photography angle of a display image and a photography bearing or photography angle of a vicinity image. Accordingly, it can be intuitively understood how much change is required in the bearing or inclination angle to which the digital camera 10 is oriented in order to display the vicinity image.

Fifth Exemplary Embodiment

Figure 18:
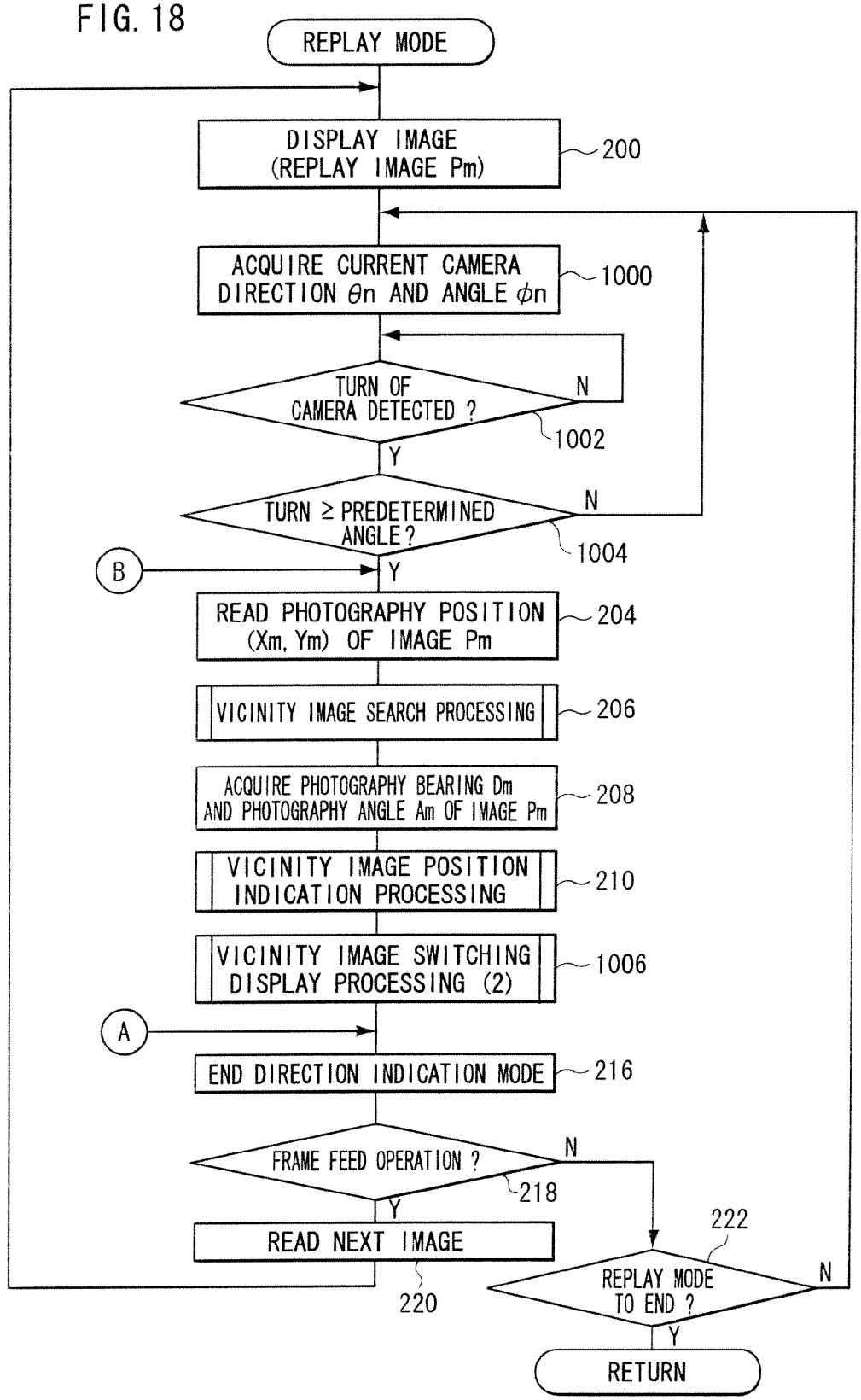
FIG. 18 is a flowchart showing a processing routine in a replay mode of a fifth exemplary embodiment.

For the first exemplary embodiment, a case was described in which processing of a direction indication mode is started by selection from a menu. For the fifth exemplary embodiment however, a case will be described in which processing of the direction indication mode starts when the bearing or inclination angle to which a digital camera is oriented changes by a predetermined amount. Structures, in the structure of a digital camera of the fifth exemplary embodiment, that are the same as structures of the digital camera 10 of the above-described first exemplary embodiment, and processes that are the same, will be assigned the same reference numerals, and illustrations and descriptions thereof will not be given. A processing routine of a replay mode of the fifth exemplary embodiment will be described with reference to FIG. 18 and FIG. 19.

In step 1000, a bearing θn representing a bearing to which the digital camera 10 is oriented, which is sensed by the electronic compass 66, is acquired, and a current inclination 4n of the digital camera 10, which is sensed by the inclination sensor 68, is acquired.

Next, in step 1002, by judging whether or not a bearing and inclination to which the digital camera 10 is oriented have changed, turning of the digital camera 10 is detected. If a turn is detected, the routine advances to step 1004, and if a turn is not detected, the routine waits until a turn is detected.

Then, in step 1004, what angle an angle of the turn of the digital camera 10 has turned through is calculated, measuring from the bearing φn or inclination φn acquired in step 1000, and it is judged whether or not the calculated angle is greater than a predetermined angle. If the calculated angle is greater than the predetermined angle, the routine advances to step 204, and processing of the direction indication mode starts. If the calculated angle is less than the predetermined angle, the routine returns to step 1000.

Figure 19:
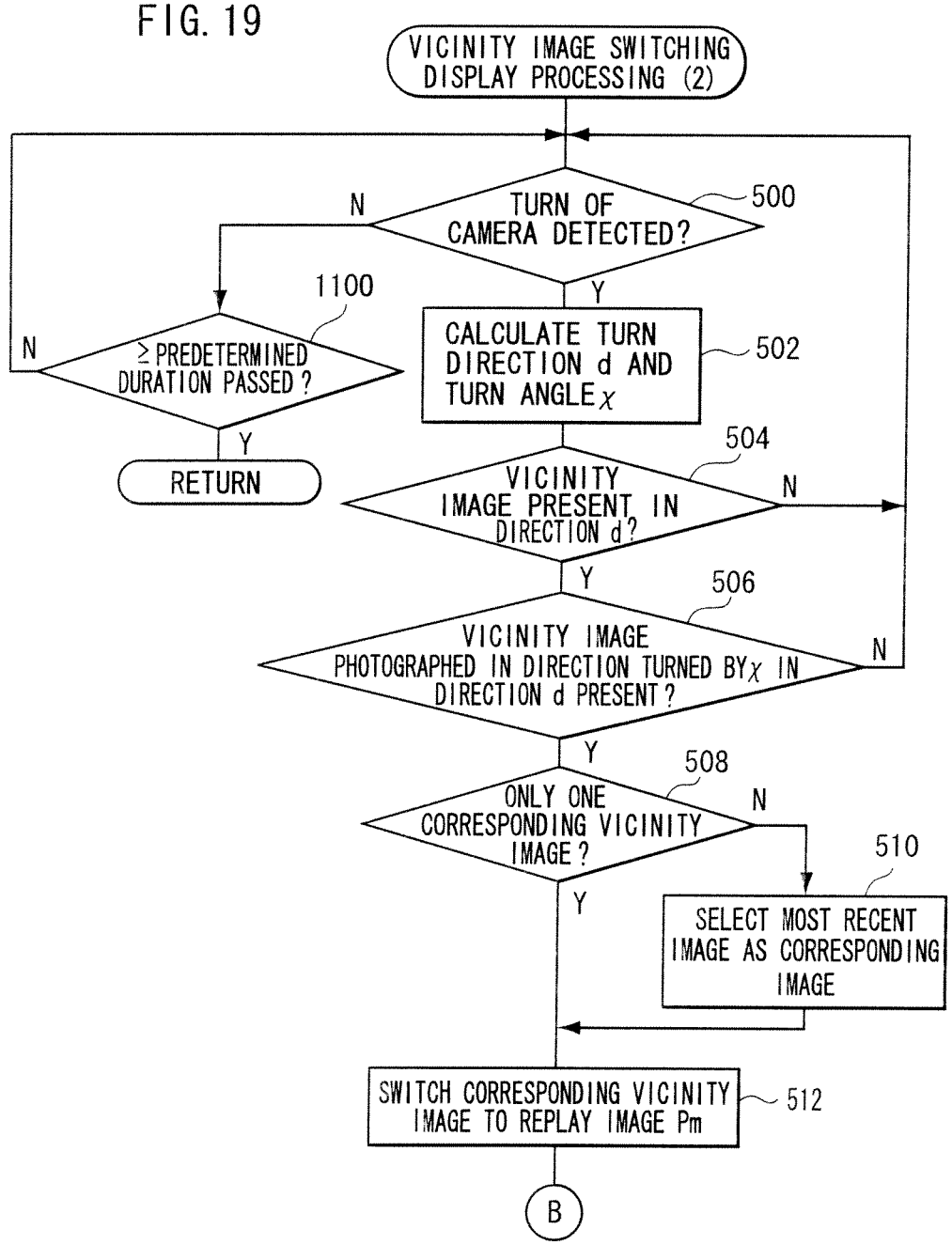
FIG. 19 is a flowchart showing a processing routine of vicinity image switching display of the fifth exemplary embodiment.

The routine goes through step 204 to step 210 and advances to step 1006, and vicinity image switching display processing is executed. FIG. 19 is a flowchart showing a processing routine of the vicinity image switching display of the present exemplary embodiment.

In step 500, if a turn is not detected, the routine advances to step 1100, and it is judged whether or not a predetermined duration has passed in the state in which a turn has not been detected. When the predetermined duration has passed, the routine advances to step 216 of FIG. 18, and the direction indication mode ends. While the predetermined duration has not passed, the routine returns to step 500, and the routine waits until a turn is detected.

Thus, it is possible to start processing of the direction indication mode by turning the digital camera 10 through a predetermined angle, and to stop the direction indication mode by not turning the digital camera 10 for over a predetermined duration. Therefore, it is possible to implement display of vicinity images without any need for complex operations such as selection from a displayed menu, predetermined button operations or the like.

Figure 20:
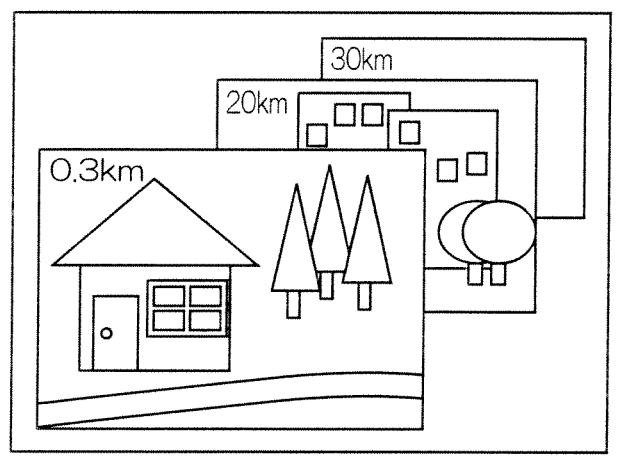
FIG. 20 is an example of a screen displaying plural vicinity images.

Anyway, in the exemplary embodiments described above, when there are plural vicinity images in the same direction, the image with the most recent photography date and time is displayed. However, as shown in FIG. 20, the plural vicinity images may be displayed superimposed. If the vicinity images are displayed with an image whose photography position is closest, with respect to the photography position of a reference image or from a current position, being displayed largest in the foreground, then a sense of distance of the photography positions of the respective images is easily grasped.

Furthermore, in the exemplary embodiments described above, the directions of vicinity images are leftward, rightward, frontward, rearward, upward and downward. However, a diagonally left-upward direction and suchlike may be added. Moreover, even more precise directions may be distinguished.

Further still, in the exemplary embodiments described above, arrows are used as the indicators that indicate that vicinity images are present. However, display by texts is possible, such as "Another picture to the left" or the like.

Moreover, the exemplary embodiments described above may be respectively combined. For example: selective switching between the respective direction indication modes of the first exemplary embodiment, the second exemplary embodiment and the third exemplary embodiment may be enabled; the direction and distance display processing of the third exemplary embodiment and the processing to alter the lengths of arrow indicators of the fourth exemplary embodiment may be combined; and if, in the third exemplary embodiment, a bearing to which the digital camera 10 is currently oriented and a photographic bearing of an image that is being displayed match, processing may switch to the vicinity image display processing that measures from the image being displayed of the first exemplary embodiment.

Embodiments of the present invention are described above, but the present invention is not limited to the embodiments as will be clear to those skilled in the art.

According to a first aspect of the present invention, there is provided an image display device comprising: a display that displays an image based on image data including photography information, the photography information including position information representing a photography position and attitude angle information representing an attitude angle of a camera at a time of photography; an attitude angle detection unit that detects an attitude angle of the display; and a controller that, when the attitude angle of the display is altered while the image according to the image data is displayed, controls the display based on the position information and the attitude angle information of the image displayed at the display and based on the attitude angle detected by the attitude angle detection unit, so as to display an image that was photographed within a predetermined region with respect to the position information of the image displayed at the display and that includes attitude angle information that corresponds to the detected attitude angle.

According to an image display device of the first aspect of the present invention, an image corresponding to image data is displayed at the display based on the image data, which includes the photography information including the position information that represents a photography position and the attitude angle information that represents an attitude angle of the camera at the time of photography. Here, the attitude angle information includes an upward/downward photography angle and a bearing angle representing a photography bearing. The photography information also includes a date and time at which the image was photographed.

When an attitude angle of the display is changed while the image corresponding to the image data is being displayed, the controller controls the display, based on the position information and the attitude angle information of the image being displayed at the display and based on the attitude angle of the display detected by the attitude angle detection unit, such that an image is displayed that was photographed within the predetermined region with respect to the position information of the image being displayed at the display and that includes attitude angle information that corresponds to the detected attitude angle.

Thus, with respect to the image that was being displayed at the display, an image that corresponds to the attitude angle of the display is displayed. Consequently, a sense of place at a time of photography can be reproduced without any need for bulky data such as map data, and positional relationships of images that were photographed in a vicinity can be intuitively understood.

Further, in the first aspect of the present invention, the predetermined region may be alterable. Hence, vicinity images may be images that were photographed in a desired range.

According to a second aspect of the present invention, there is provided an image display device comprising: a display that displays an image based on image data including photography information, the photography information including position information representing a photography position and attitude angle information representing an attitude angle of a camera at a time of photography; an attitude angle detection unit that detects an attitude angle of the display; a position detection unit that detects a current position of the display; and a controller that controls the display based on the attitude angle detected by the attitude angle detection unit and the current position of the display detected by the position detection unit, so as to display an image that includes position information that corresponds to the current position and that includes attitude angle information that corresponds to the detected attitude angle.

On the basis of an attitude angle detected by the attitude angle detection unit and a current position of the display detected by the position detection unit, the controller controls the display so as to display an image that includes position information corresponding to the current position and attitude angle information corresponding to the detected attitude angle.

Thus, because an image with an attitude angle and photography position corresponding to an attitude angle and a photography position at the time of photography can be displayed, a sense of place at a time of photography can be reproduced without any need for bulky data such as map data, and positional relationships of images that were photographed in a vicinity can be intuitively understood.

In the first aspect and the second aspect of the present invention, the controller may control such that images are displayed based on image data with photography date and time within an alterable predetermined timeframe. Consequently, vicinity images may be images that were photographed within the desired timeframe.

In the first aspect and the second aspect of the present invention, if there are a plurality of images including the attitude angle information corresponds to the detected attitude angle, the controller may control such that the image with the most recent photography date and time is displayed. Further, the controller may control such that these images are displayed superimposed in order, from the foreground, of closeness of distances between the respective photography positions represented by the position information of the images corresponding to the detected attitude angle and the current position of the display.

The controller may also control such that an indicator is displayed indicating a direction in which a vicinity image is present, the vicinity image having been photographed in a vicinity of the photography position of the image that is being displayed at the display. Further, one or more of length, size and color of this indicator may be altered in accordance with the magnitude of a difference between a current attitude angle and the attitude angle of the vicinity image, and the indicator may comprise an icon that indicates the direction in which the vicinity image is present. Thus, the presence of the vicinity image and the direction in which it is present can be intuitively understood.

According to a third aspect of the present invention, there is provided an image display device comprising: a display that displays an image based on image data including photography information, the photography information including position information representing a photography position and bearing angle information representing a bearing angle of a camera at a time of photography; a bearing angle detection unit that detects a bearing angle of the display; a position detection unit that detects a current position of the display; and a controller that controls the display, based on the position information and the bearing angle information of the image displayed at the display, and based on the current position of the display detected by the position detection unit and the bearing angle detected by the bearing angle detection unit, so as to display an indicator that indicates the photography position of the image displayed at the display with respect to the current position, and the bearing angle at the time of photography of the image displayed at the display with respect to the detected bearing angle.

On the basis of the position information and attitude angle information of the image that is being displayed at the display, and the current position of the display detected by the position detection unit and the attitude angle detected by the attitude angle detection unit, the controller controls the display so as to display an indicator indicating the photography position of the image displayed at the display, with respect to the current position, and the attitude angle at the time of photography of the image displayed at the display, with respect to the detected bearing angle. Thus, information can be given of how far the position of the image being displayed is from the current position and of which direction the image was photographed toward.

The indicator may be altered in one or more of length, size and color in accordance with the magnitude of a difference between the current bearing angle and the bearing angle of the image being displayed at the display, and the indicator may comprise an icon that indicates the bearing angle at the time of photography. Consequently, information on which direction the image being displayed was photographed toward in order to display a vicinity image can be given more intuitively.

In the first to third aspects of the present invention, control by the controller may start when the attitude angle of the display is altered by more than a predetermined value, and control by the controller may end when a predetermined duration passes without the attitude angle of the display being altered. Consequently, vicinity images can be displayed without any need for complicated operations such as selection from displayed menus, operation of predetermined buttons or the like.

In fourth to sixth aspects of the present invention, a portable device with a photography function, such as a digital camera, a camera-equipped portable telephone, a camera-equipped PDA or the like, is provided with an image display device of the first to third aspects of the present invention.

According to a seventh aspect of the present invention, there is provided an image display method comprising: displaying at a display an image based on image data including photography information, the photography information including position information representing a photography position and attitude angle information representing an attitude angle of a camera at a time of photography; detecting an attitude angle of the display when an attitude angle of the display is altered while the image according to the image data is displayed; and displaying, based on the position information and the attitude angle information of the image displayed at the display and based on the detected attitude angle, an image that was photographed within a predetermined region with respect to the position information of the image displayed at the display and that includes attitude angle information that corresponds to the detected attitude angle.

According to an eighth aspect of the present invention, there is provided an image display method comprising: detecting an attitude angle of a display, the display displaying an image based on image data including photography information, and the photography information including position information representing a photography position and attitude angle information representing an attitude angle of a camera at a time of photography; detecting a current position of the display; and displaying an image based on the detected attitude angle and the detected current position, the image including position information that corresponds to the detected current position and including attitude angle information that corresponds to the detected attitude angle.

According to a ninth aspect of the present invention, there is provided an image display method comprising: displaying an image based on image data including photography information at a display, the photography information including position information representing a photography position and bearing angle information representing a bearing angle of a camera at a time of photography; detecting a bearing angle of the display; detecting a current position of the display; and displaying an indicator based on the position information and the bearing angle information of the image displayed at the display, and based on the detected current position and the detected bearing angle, the indicator indicating the photography position of the image displayed at the display with respect to the current position, and indicating the bearing angle at the time of photography of the image displayed at the display with respect to the detected bearing angle.

According to a tenth aspect of the present invention, there is provided a computer readable medium storing a program causing a computer to execute a process for displaying images, the process comprising: displaying at a display an image based on image data including photography information, the photography information including position information representing a photography position and attitude angle information representing an attitude angle of a camera at a time of photography; detecting the attitude angle of the display when an attitude angle of the display is altered while the image according to the image data is displayed; and displaying an image based on the position information and attitude angle information of the image displayed at the display and based on the detected attitude angle, the image being photographed within a predetermined region with respect to the position information of the image displayed at the display and including attitude angle information that corresponds to the detected attitude angle.

According to an eleventh aspect of the present invention, there is provided a computer readable medium storing a program causing a computer to execute a process for displaying images, the process comprising: detecting an attitude angle of a display, the display displaying an image based on image data including photography information, the photography information including position information representing a photography position and attitude angle information representing an attitude angle of a camera at a time of photography; detecting a current position of the display; and displaying an image based on the detected attitude angle and the detected current position, the image including position information that corresponds to the detected current position and including attitude angle information that corresponds to the detected attitude angle.

According to a twelfth aspect of the present invention, there is provided a computer readable medium storing a program causing a computer to execute a process for displaying images, the process comprising: displaying at a display an image based on image data including photography information, the photography information including position information representing a photography position and bearing angle information representing a bearing angle of a camera at a time of photography; detecting a bearing angle of the display; detecting a current position of the display; and displaying an indicator based on the position information and the bearing angle information of the image displayed at the display, and based on the detected current position and the detected bearing angle, the indicator indicating the photography position of the image displayed at the display with respect to the current position, and indicating the bearing angle at the time of photography of the image displayed at the display with respect to the detected bearing angle.

According to the present invention as described above, effects are provided in that a sense of place at a time of photography can be reproduced without any need for bulky data such as map data, and in that positional relationships with other images can be intuitively understood.

What is claimed is:

1. An image display device comprising:
    a display that displays an image according to a piece of photography image data on a display screen based on plural pieces of photography image data stored in a storage unit, the photography image data including photography information, and the photography information including photography attitude angle information representing an attitude angle of a camera at a time of photography;
    an attitude angle detection unit that detects an attitude angle of the display; and
    a controller that, when the attitude angle detected by the attitude angle detection unit is altered while the image according to the image data is displayed, controls the display, based on the photography attitude angle information of the image displayed at the display and based on an attitude angle alteration amount obtained from the attitude angle detected by the attitude angle detection unit, so as to display another image in accordance with another piece of photography image data based on the pieces of photography image data stored in the storage unit and that includes photography attitude angle information that represents an attitude angle with an angle altered according to the attitude angle alteration amount with respect to an attitude angle which is represented by the photography attitude angle information of the image which is displayed.

2. The image display device of claim 1, wherein the photography information further includes position information, and the controller controls the display, based on positional information of the image which is displayed, based on the photography attitude angle information of the image which is displayed and based on the attitude angle alteration amount obtained from the attitude angle detected by the attitude angle detection unit, so as to display another image that was photographed in a predetermined area with respect to the position information of the image which is displayed and that includes the photography attitude angle information that represents the attitude angle with an angle altered according to the attitude angle alteration amount with respect to the attitude angle which is represented by the photography attitude angle information of the image which is displayed.

3. The image display device of claim 2, wherein the predetermined region is alterable.

4. The image display device of claim 2 wherein, if there are a plurality of images each including attitude angle information that corresponds to the alteration amount of the attitude angle which is obtained from the detected attitude angle, the controller controls such that the images are displayed superimposed, in order, from the foreground, of closeness of distances between the respective photography positions represented by the position information of the images corresponding to the alteration amount of the attitude angle which is obtained from the detected attitude angle and the photography position represented by the position information of the image displayed at the display.

5. The image display device of claim 2, wherein the controller controls such that an indicator is displayed, the indicator indicating a direction in which a vicinity image is present, the vicinity image having been photographed in a vicinity of the photography position represented by the position information of the image displayed at the display.

6. The image display device of claim 5, wherein at least one of length, size and color of the indicator is altered in accordance with the magnitude of a difference between the attitude angle represented by the attitude angle information of the image displayed at the display and the attitude angle of the vicinity image, and the indicator comprises an icon that indicates the direction in which the vicinity image is present.

7. The image display device of claim 1, wherein the controller controls such that an image is displayed based on image data, the image data including a date and time of photography, and the date and time of the image data being within a predetermined alterable timeframe.

8. The image display device of claim 1, wherein, if there are a plurality of images each including attitude angle information that corresponds to the alteration amount of the attitude angle which is obtained from the detected attitude angle, the controller controls such that the image with the most recent photography date and time is displayed.

9. The image display device of claim 1, wherein control by the controller starts when the attitude angle of the display is altered by more than a predetermined value.

10. The image display device of claim 1, wherein control by the controller ends when a predetermined duration passes without the attitude angle of the display being altered.

11. The image display device of claim 1, wherein the photography information includes additional information other than the photography attitude angle information, and wherein, if there are a plurality of images each including attitude angle information that corresponds to the alteration amount of the attitude angle which is obtained from the detected attitude angle, the controller controls such that the images are displayed superimposed based on the additional information.

* * * * *